US012429785B2

(12) United States Patent
Watanabe et al.

(10) Patent No.: US 12,429,785 B2
(45) Date of Patent: Sep. 30, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Shuntaro Watanabe, Kanagawa (JP); Taichi Sato, Shizuoka (JP); Kohei Makisumi, Shizuoka (JP); Masatada Hirota, Shizuoka (JP); Kunihiko Sekido, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 521 days.

(21) Appl. No.: 17/936,088

(22) Filed: Sep. 28, 2022

(65) Prior Publication Data

US 2023/0115474 A1 Apr. 13, 2023

(30) Foreign Application Priority Data

Oct. 8, 2021 (JP) ................................. 2021-166511
Sep. 6, 2022 (JP) ................................. 2022-141488

(51) Int. Cl.
*G03G 5/082* (2006.01)
*G03G 5/147* (2006.01)
*G03G 21/18* (2006.01)

(52) U.S. Cl.
CPC ......... *G03G 5/082* (2013.01); *G03G 5/14704* (2013.01); *G03G 21/1814* (2013.01)

(58) Field of Classification Search
CPC . G03G 5/082; G03G 5/14704; G03G 21/1814
See application file for complete search history.

(56) References Cited

U.S. PATENT DOCUMENTS 5,604,061 A 2/1997 Sekido
5,955,250 A * 9/1999 Christian ................ G03C 1/85
430/528

(Continued)

FOREIGN PATENT DOCUMENTS

EP 3 367 167 A1 8/2018
JP 2009229495 A * 10/2009

(Continued)

OTHER PUBLICATIONS

English machine translation of the description of JP-2009229495-A (Year: 2009).*

(Continued)

*Primary Examiner* — Mark F. Huff
*Assistant Examiner* — Boone Alexander Evans
(74) *Attorney, Agent, or Firm* — VENABLE LLP

(57) ABSTRACT

An electrophotographic photosensitive member includes an electroconductive support, a photosensitive layer, and a protection layer The protection layer comprises an electroconductive particle with has a surface containing a titanium oxide and a niobium atom. An atomic concentration ratio of the niobium atom to the titanium atom in the titanium oxide is 0.01 to 0.20, and the electroconductive particle is surface-treated with a compound having a silicon atom. A content ratio of the electroconductive particle in the protection layer is 5 vol % or more and less than 40 vol % with respect to a total volume of the protection layer, and relative concentrations of a plurality of atoms at a surface of the protection layer satisfy specific conditions, as determined by X-ray photoelectron spectroscopy.

5 Claims, 3 Drawing Sheets

(56) References Cited

U.S. PATENT DOCUMENTS

| | | | |
|---|---|---|---|
| 6,228,546 B1 | 5/2001 | Kashizaki | |
| 7,141,341 B2 | 11/2006 | Sekido | |
| 8,343,699 B2 | 1/2013 | Nagasaka | |
| 8,465,889 B2 | 6/2013 | Sekido | |
| 8,524,430 B2 | 9/2013 | Takagi | |
| 8,538,298 B2 | 9/2013 | Harada | |
| 8,546,050 B2 | 10/2013 | Maruyama | |
| 8,632,931 B2 | 1/2014 | Sekido | |
| 8,795,936 B2 | 8/2014 | Sekido | |
| 9,029,054 B2 | 5/2015 | Okuda | |
| 9,063,505 B2 | 6/2015 | Sekiya | |
| 9,069,267 B2 | 6/2015 | Kaku | |
| 9,075,333 B2 | 7/2015 | Uematsu | |
| 9,098,006 B2 | 8/2015 | Uematsu | |
| 9,158,213 B2 | 10/2015 | Taniguchi | |
| 9,207,550 B2 | 12/2015 | Okuda | |
| 9,256,153 B2 | 2/2016 | Aoyama | |
| 9,274,442 B2 | 3/2016 | Sato | |
| 9,280,072 B2 | 3/2016 | Ogaki | |
| 9,335,645 B2 | 5/2016 | Tagami | |
| 9,442,401 B2 | 9/2016 | Sekido | |
| 9,448,502 B2 | 9/2016 | Taniguchi | |
| 9,477,163 B2 | 10/2016 | Nishi | |
| 9,599,914 B2 | 3/2017 | Uematsu | |
| 9,645,517 B2 | 5/2017 | Sato | |
| 9,760,030 B2 | 9/2017 | Sekiya | |
| 9,772,568 B2 | 9/2017 | Sekido | |
| 9,811,011 B2 | 11/2017 | Nishi | |
| 9,851,648 B2 | 12/2017 | Nishi | |
| 9,864,285 B2 | 1/2018 | Nishi | |
| 9,921,498 B2 | 3/2018 | Sekido | |
| 10,025,216 B2 | 7/2018 | Uematsu | |
| 10,162,278 B2 | 12/2018 | Kuno | |
| 10,203,617 B2 | 2/2019 | Kuno | |
| 10,303,085 B2 | 5/2019 | Sato | |
| 10,372,050 B2 | 8/2019 | Nishi | |
| 10,831,117 B2 | 11/2020 | Sakakibara | |
| 10,942,462 B2 | 3/2021 | Ito | |
| 11,112,719 B2 | 9/2021 | Makisumi | |
| 11,126,097 B2 | 9/2021 | Ishida | |
| 11,137,716 B2 | 10/2021 | Hiyama | |
| 11,150,566 B2 | 10/2021 | Iwasaki | |
| 11,181,837 B2 | 11/2021 | Sekiya | |
| 11,237,493 B2 | 2/2022 | Makisumi | |
| 11,249,407 B2 | 2/2022 | Watariguchi | |
| 11,340,553 B2 | 5/2022 | Watariguchi | |
| 2012/0076539 A1 | 3/2012 | Sato | |
| 2015/0099217 A1 | 4/2015 | Hatano | |
| 2018/0095404 A1* | 4/2018 | Fujita | G03G 5/14795 |
| 2020/0393772 A1 | 12/2020 | Takeuchi | |
| 2021/0318628 A1 | 10/2021 | Sekido | |
| 2021/0318629 A1 | 10/2021 | Nishi | |
| 2021/0364937 A1 | 11/2021 | Kuno | |

FOREIGN PATENT DOCUMENTS

| | | |
|---|---|---|
| JP | 2015-132639 A | 7/2015 |
| JP | 2018-128515 A | 8/2018 |

OTHER PUBLICATIONS

U.S. Appl. No. 17/814,048, Kaname Watariguchi, filed Jul. 21, 2022.
U.S. Appl. No. 17/815,276, Akihiro Maruyama, filed Jul. 27, 2022.
U.S. Appl. No. 17/816,024, Kenichi Kaku, filed Jul. 29, 2022.
U.S. Appl. No. 17/816,028, Kohei Makisumi, filed Jul. 29, 2022.
U.S. Appl. No. 17/823,627, Masashi Nishi, filed Aug. 31, 2022.
U.S. Appl. No. 17/930,206, Kunihiko Sekido, filed Sep. 7, 2022.
U.S. Appl. No. 17/937,509, Nobuhiro Nakamura, filed Oct. 3, 2022.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, a process cartridge including the electrophotographic photosensitive member, and an electrophotographic apparatus including the electrophotographic photosensitive member.

Description of the Related Art

As an electrophotographic photosensitive member to be mounted onto an electrophotographic apparatus, there is widely used an electrophotographic photosensitive member containing an organic photoconductive substance serving as a charge-generating substance. In recent years, an improvement in mechanical durability, that is, abrasion resistance, of the electrophotographic photosensitive member has been required for the purposes of lengthening a lifetime of the electrophotographic photosensitive member and improving image quality at the time of its repeated use.

Meanwhile, when abrasion resistance of the electrophotographic photosensitive member is improved, a discharge product, which is produced by discharge occurring between the photosensitive member and a charging member in a charging step, and moisture remain on a surface of the electrophotographic photosensitive member. Owing to the discharge product and moisture, an electrostatic latent image formed on the electrophotographic photosensitive member collapses, and hence a phenomenon called image smearing, in which the desired electrostatic latent image collapses on an output image on paper or the like, sometimes occurs.

Discharge on the surface of the electrophotographic photosensitive member produces oxidizing gases, such as ozone and a nitrogen oxide, and the oxidizing gases deteriorate a material used in a surface layer of the electrophotographic photosensitive member, to thereby produce the discharge product. In addition, adsorption of moisture reduces resistance of the surface of the electrophotographic photosensitive member. It is considered that those factors cause the image smearing to occur.

Besides, as the abrasion resistance of the surface of the electrophotographic photosensitive member becomes higher, the above-mentioned substances causing the image smearing to occur, such as the discharge product and moisture, become less easy to remove, and hence the image smearing becomes more liable to occur.

As a technology for ameliorating the image smearing, there is given a method involving incorporating electroconductive particles into the surface layer of an electrophotographic photosensitive member to control a volume resistivity of the surface layer of the electrophotographic photosensitive member.

On the surface of the electrophotographic photosensitive member, a dark portion potential is formed through application of a voltage from the charging member in the charging step. It is conceived that the charging for forming the dark portion potential is performed through two kinds of processes. One is a process in which, in accordance with Paschen's law, the charging of the surface of the electrophotographic photosensitive member proceeds at the time of dielectric breakdown of an air layer between the charging member and the surface of the electrophotographic photosensitive member. In the other process, when a contact potential between the electrophotographic photosensitive member and the charging member is sufficiently small, charging is performed through injection charging, in which a charge is injected from the charging member into the surface of the electrophotographic photosensitive member, without discharge caused by the applied voltage.

When the electroconductive particles are incorporated into the surface layer to control the volume resistivity, a ratio of the charging through the injection charging of the electrophotographic photosensitive member from the charging member in the charging step can be increased. That is, injection chargeability of the electrophotographic photosensitive member can be enhanced, and thus the discharge can be suppressed.

In Japanese Patent Application Laid-Open No. 2009-229495, there is a disclosure of a technology involving incorporating a component obtained by subjecting a curable compound to a reaction, and anatase-type titanium oxide containing a niobium atom into a protection layer (surface layer) of an electrophotographic photosensitive member. In Japanese Patent Application Laid-Open No. 2009-229495, there is a description that the technology improves cleaning performance in the case where the electrophotographic photosensitive member is used over a long period of time.

In addition, in Japanese Patent Application Laid-Open No. 2018-128515, there is a disclosure of a technology involving incorporating N-type semiconductor particles, such as tin oxide, titanium oxide, zinc oxide, and indium tin oxide, into a surface protection layer (surface layer) of an electrostatic latent image-bearing member (electrophotographic photosensitive member). In Japanese Patent Application Laid-Open No. 2018-128515, there is a proposal that a scavenging phenomenon in the case of using a two-component developer be suppressed by the technology.

Further, in Japanese Patent Application Laid-Open No. 2015-132639, there is a disclosure of a technology involving incorporating a metal oxide, a photocurable resin serving as a binder resin, and a photoreactive graft polymer having a silicone side chain into a protection layer (surface layer) of an electrophotographic photosensitive member. In Japanese Patent Application Laid-Open No. 2015-132639, there is a description that the technology improves slipperiness of the surface of the electrophotographic photosensitive member, thereby enabling appropriate removal of a hydrophilic substance adhering to the surface of the photosensitive member, which is produced by an acidic gas, by a cleaning method involving bringing a cleaning blade into abutment therewith.

In each of the technologies disclosed in Japanese Patent Application Laid-Open No. 2009-229495, Japanese Patent Application Laid-Open No. 2018-128515, and Japanese Patent Application Laid-Open No. 2015-132639, the configuration in which the electroconductive particles are incorporated into the surface layer to enable the control of the volume resistivity of the surface layer is used, but a sufficient suppressing effect on the image smearing has not been obtained in some cases. In addition, the electrophotographic photosensitive member described in Japanese Patent Application Laid-Open No. 2009-229495 has had room for improvement in charging uniformity.

SUMMARY OF THE INVENTION

Accordingly, an object of the present invention is to provide an electrophotographic photosensitive member excellent in suppression of image smearing and in charging uniformity. Another object of the present invention is to provide a process cartridge including the electrophotographic photosensitive member, and an electrophotographic apparatus including the process cartridge.

The above-mentioned objects are achieved by the present invention described below. According to one aspect of the present invention, there is provided an electrophotographic photosensitive member comprising: an electroconductive support; a photosensitive layer; and a protection layer, wherein the protection layer comprises an electroconductive particle, the electroconductive particle has a surface comprising a metal oxide containing a titanium atom and a niobium atom, an atomic concentration ratio of the niobium atom to the titanium atom in the metal oxide is 0.01 to 0.20, the electroconductive particle is surface-treated with a compound having a silicon atom, a content ratio of the electroconductive particle in the protection layer is 5 vol % or more and less than 40 vol % with respect to a total volume of the protection layer, and when at a surface of the protection layer, a total of a relative concentration d(C) of a carbon atom, a relative concentration d(O) of an oxygen atom, a relative concentration d(Ti) of the titanium atom, a relative concentration d(Nb) of the niobium atom, and a relative concentration d(Si) of the silicon atom, which are determined by X-ray photoelectron spectroscopy, is defined as 100.0 atomic %, the following expressions (1) to (3) are satisfied:

$$0<d(\mathrm{Ti})\leq 2.0 \quad (1),$$

$$0<d(\mathrm{Si})\leq 8.0 \quad (2), \text{ and}$$

$$0.01\leq d(\mathrm{Ti})/d(\mathrm{Si})\leq 1.0 \quad (3).$$

According to another aspect of the present invention, there is provided a process cartridge including: the above-mentioned electrophotographic photosensitive member; and at least one unit selected from the group consisting of: a charging unit; a developing unit; and a cleaning unit, the process cartridge integrally supporting the electrophotographic photosensitive member and the at least one unit, and being detachably attachable onto a main body of an electrophotographic apparatus.

According to still another aspect of the present invention, there is provided an electrophotographic apparatus including: the above-mentioned electrophotographic photosensitive member; a charging unit; an exposing unit; a developing unit; and a transfer unit.

Further features of the present invention will become apparent from the following description of exemplary embodiments with reference to the attached drawings.

DESCRIPTION OF THE EMBODIMENTS

Figure 1:
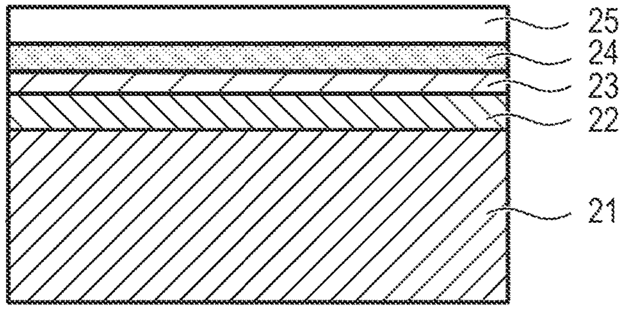
FIG. 1 is a schematic view for illustrating an example of the configuration of an electrophotographic photosensitive member according to the present invention.

An electrophotographic photosensitive member according to the present invention is an electrophotographic photosensitive member comprising: an electroconductive support; a photosensitive layer; and a protection layer, wherein the protection layer comprises an electroconductive particle, the electroconductive particle has a surface comprising a metal oxide containing a titanium atom and a niobium atom, an atomic concentration ratio of the niobium atom to the titanium atom in the metal oxide is 0.01 to 0.20, the electroconductive particle is surface-treated with a compound having a silicon atom, a content ratio of the electroconductive particle in the protection layer is 5 vol % or more and less than 40 vol % with respect to a total volume of the protection layer, and when at a surface of the protection layer, a total of a relative concentration d(C) of a carbon atom, a relative concentration d(O) of an oxygen atom, a relative concentration d(Ti) of the titanium atom, a relative concentration d(Nb) of the niobium atom, and a relative concentration d(Si) of the silicon atom, which are determined by X-ray photoelectron spectroscopy, is defined as 100.0 atomic %, the following expressions (1) to (3) are satisfied:

$$0<d(\mathrm{Ti})\leq 2.0 \quad (1),$$

$$0<d(\mathrm{Si})\leq 8.0 \quad (2), \text{ and}$$

$$0.01\leq d(\mathrm{Ti})/d(\mathrm{Si})\leq 1.0 \quad (3).$$

According to investigations made by the inventors, the anatase-type titanium oxide containing a niobium atom described in Japanese Patent Application Laid-Open No. 2009-229495 has a low content of the niobium atom at its surface. Accordingly, its surface resistance cannot be said to be optimal as electroconductive particles, and hence the injection chargeability of the electrophotographic photosensitive member was low. In addition, the anatase-type titanium oxide containing a niobium atom used in Japanese Patent Application Laid-Open No. 2009-229495 had low hydrophobicity because of being free of surface treatment, and hence had room for improvement in dispersibility in the protection layer. Accordingly, the degree of exposure of the electroconductive particles on the surface of the protection layer was increased, and hence the resistance of the protection layer was reduced through the adsorption of moisture, leading to the occurrence of image smearing in some cases. Further, the electroconductive particles were exposed on the surface of the protection layer in a nonuniform manner to reduce charging uniformity in some cases.

In addition, in the technology described in Japanese Patent Application Laid-Open No. 2018-128515, the degree of exposure of the N-type semiconductor particles serving as the electroconductive particles on the surface of the surface protection layer was high, and hence image smearing occurred under a high-humidity environment in some cases.

Further, in the technology described in Japanese Patent Application Laid-Open No. 2015-132639, the degree of exposure of the electroconductive particles on the surface of the electrophotographic photosensitive member was low, and hence the injection chargeability of the electrophotographic photosensitive member was low, with the result that a discharge product accumulated during long-term use to cause image smearing in some cases.

The inventors presume that the reason the electrophotographic photosensitive member according to the present invention is excellent in suppression of image smearing is as described below.

As described above, discharge on the surface of the electrophotographic photosensitive member produces oxidizing gases, such as ozone and a nitrogen oxide, and the oxidizing gases deteriorate a material used in the surface layer of the electrophotographic photosensitive member, to thereby produce a discharge product. The production of the discharge product on the surface of the electrophotographic photosensitive member, and the adsorption of moisture onto the surface of the electrophotographic photosensitive member reduce the volume resistivity at the surface of the electrophotographic photosensitive member. It is considered that image smearing occurs owing to the reduction in volume resistivity at the surface of the electrophotographic photosensitive member.

Besides, when the electroconductive particles are incorporated into the surface layer of the electrophotographic photosensitive member to control the volume resistivity of the surface layer, to thereby enhance the injection chargeability, the discharge on the surface of the electrophotographic photosensitive member in a charging step can be suppressed. Conceivably for this reason, the production of the discharge product serving as a cause of the occurrence of image smearing can be suppressed.

However, when the degree of exposure of the electroconductive particles on the surface layer is increased in order to enhance the injection chargeability, moisture is liable to adsorb thereonto under a high-humidity environment. Accordingly, image smearing was not able to be sufficiently suppressed under a high-humidity environment in some cases.

Accordingly, it is conceived that moisture adsorption under a high-humidity environment needs to be further suppressed under a state in which the electroconductive particles are exposed on the surface to such a degree that the injection chargeability can be made sufficiently high.

The inventors have made extensive investigations, and as a result, have found that the electrophotographic photosensitive member according to the present invention having the above-mentioned configuration can achieve both of an improvement in injection chargeability and the suppression of moisture adsorption under a high-humidity environment.

That is, the electroconductive particles to be used in the present invention each have a suitable surface resistance, and the electrophotographic photosensitive member according to the present invention contains the electroconductive particles in its protection layer (surface layer) in an appropriate amount. Thus, the volume resistivity of the protection layer of the electrophotographic photosensitive member can be controlled to enhance the injection chargeability of the electrophotographic photosensitive member from the charging member in the charging step, and hence discharge can be suppressed. In addition, in the electrophotographic photosensitive member according to the present invention, the degree of exposure of the electroconductive particles on the surface of the protection layer is appropriately controlled, and besides, the surfaces of the electroconductive particles are sufficiently hydrophobized. With this configuration, the adsorption of moisture onto the surface of the electrophotographic photosensitive member under a high-humidity environment can be suppressed while uniform chargeability is maintained.

In the charging step of the electrophotographic photosensitive member, a higher ratio of a dark portion potential to an applied voltage indicates that the injection chargeability is higher and the discharge in the charging step is more suppressed. Accordingly, the injection chargeability of the electrophotographic photosensitive member may be evaluated by determining the ratio of the dark portion potential on the surface of the electrophotographic photosensitive member to the voltage applied to the surface of the electrophotographic photosensitive member.

The injection chargeability of the electrophotographic photosensitive member according to the present invention when evaluated in accordance with the foregoing is preferably 0.75 or more, more preferably 0.85 or more, still more preferably 0.90 or more.

A specific configuration of the electrophotographic photosensitive member according to the present invention is described below.

FIG. 1 is a view for illustrating an example of the configuration of the electrophotographic photosensitive member according to the present invention. The electrophotographic photosensitive member illustrated in FIG. 1 includes an electroconductive support 21, an undercoat layer 22, a charge-generating layer 23, a charge-transporting layer 24, and a protection layer 25 serving as a surface layer.

In FIG. 1, there is illustrated an example in which the photosensitive layer included in the electrophotographic photosensitive member is a laminate-type photosensitive layer formed of the charge-generating layer 23 and the charge-transporting layer 24. However, the photosensitive layer may be a monolayer-type photosensitive layer to be described later.

In addition, the electrophotographic photosensitive member may have a configuration free of the undercoat layer 22, or may have a configuration further including an electroconductive layer to be described later between the electroconductive support 21 and the undercoat layer 22 or the photosensitive layer.

<Protection Layer (Surface Layer)>

The protection layer contains electroconductive particles.

The surface of each of the electroconductive particles contained in the protection layer contains a metal oxide containing a titanium atom and a niobium atom, and the atomic concentration ratio of the niobium atom to the titanium atom in the metal oxide is from 0.01 to 0.20.

By virtue of the electroconductive particles each containing the metal oxide having the titanium atom and the niobium atom at the above-mentioned atomic concentration ratio, the surface resistance of each of the electroconductive particles can be made suitable. Consequently, the suppression of the adsorption of moisture onto the electrophotographic photosensitive member under a high-humidity environment, and an improvement in injection chargeability of the electrophotographic photosensitive member can both be achieved.

When the atomic concentration ratio of the niobium atom to the titanium atom in the metal oxide described above is 0.01 or more, a contact potential between the protection layer and the charging member becomes small. Consequently, the surface of the electrophotographic photosensitive member can be uniformly charged, and besides, the injection chargeability of the electrophotographic photosensitive member is improved. When the atomic concentration ratio of the niobium atom to the titanium atom in the metal oxide described above is 0.20 or less, the resistivity of each of the electroconductive particles does not become excessively large, and a reduction in injection chargeability of the electrophotographic photosensitive member can be suppressed.

The atomic concentration ratio of the niobium atom to the titanium atom in the metal oxide described above is preferably 0.03 to 0.18.

The metal oxide is preferably a titanium oxide containing a niobium atom.

The atomic concentration ratio of the niobium atom to the titanium atom in the metal oxide that the electroconductive particles each contain in its surface may be determined as described below.

First, the electroconductive particles are subjected to surface composition analysis by X-ray photoelectron spectroscopy (XPS), and the content ratio of each atom is calculated based on obtained results. An apparatus and measurement conditions for the XPS are as described below.

Apparatus used: Quantum 2000 manufactured by ULVAC-PHI, Inc.
Analysis method: narrow analysis
X-ray source: Al-Kα
X-ray conditions: 100 μm, 25 W, 15 kV
Photoelectron acceptance angle: 45°
Pass Energy: 58.70 eV
Measurement range: φ100 μm Measurement is performed under the above-mentioned conditions, and a peak derived from a C—C bond of carbon is orbitals is corrected to 285 eV. After that, a relative sensitivity factor provided by ULVAC-PHI, Inc. is applied to the peak area of an atom having a peak top detected at 100 to 103 eV. The respective spectral peaks of the titanium atom and the niobium atom are integrated and converted to calculate a titanium atom concentration and a niobium atom concentration. From the resultant values of the respective atom concentrations, the atomic concentration ratio of the niobium atom to the titanium atom is calculated.

Examples of the electroconductive particles include particles each obtained by allowing a particle formed of a metal oxide, such as titanium oxide, zinc oxide, tin oxide, and indium oxide, to contain, in the surface thereof, a metal oxide containing a titanium atom and a niobium atom. Specific examples thereof include particles each obtained by doping a particle of a metal oxide having a titanium atom with a niobium atom or a niobium oxide.

Figure 6:
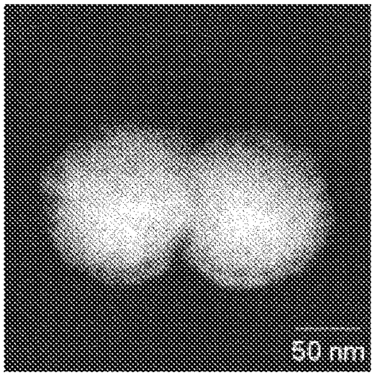
FIG. 6 is an image taken with a scanning transmission electron microscope (STEM) of an example of niobium atom-containing titanium oxide used in Examples of the present invention.
Figure 7:
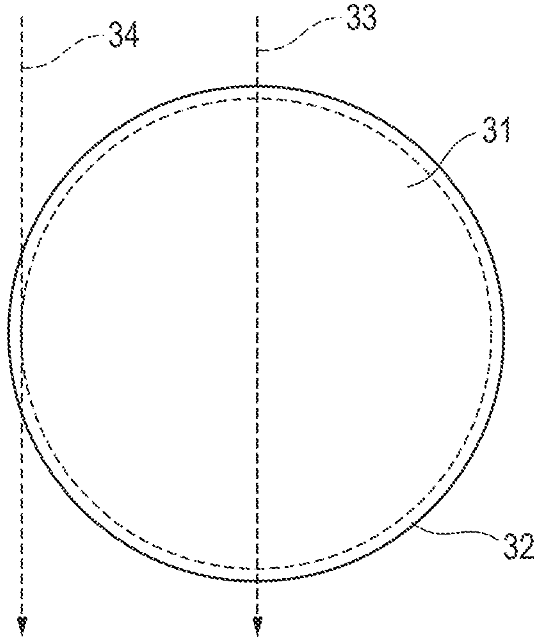
FIG. 7 is a schematic view of an example of the niobium atom-containing titanium oxide used in Examples of the present invention.

The electroconductive particles are particularly preferably titanium oxide particles each of which contains a niobium atom, and has a configuration in which the niobium atom is localized in the vicinity of the surface of the particle. This is because the localization of the niobium atom in the vicinity of the surface enables efficient transfer of a charge. More specifically, in each of the titanium oxide particles, a concentration ratio calculated as "niobium atom concentration/titanium atom concentration" at an inside portion at 5% of the maximum diameter of the particle from the surface of the particle is 2.0 or more times as high as a concentration ratio calculated as "niobium atom concentration/titanium atom concentration" at the center of the particle. The niobium atom concentration and the titanium atom concentration are obtained through use of a scanning transmission electron microscope (STEM) having connected thereto an EDS analyzer (energy-dispersive X-ray spectrometer). A STEM image of an example (X1) of titanium oxide particles used in Examples according to the present invention is shown in FIG. 6. In addition, the STEM image of FIG. 6 is schematically illustrated in FIG. 7. As described in detail later, niobium atom-containing titanium oxide particles used in Examples of the present invention are produced by coating titanium oxide particles with niobium atom-containing titanium oxide, and then firing the resultant. Accordingly, the coating niobium atom-containing titanium oxide is conceived to undergo crystal growth as niobium-doped titanium oxide through so-called epitaxial growth along a crystal of the titanium oxide serving as a core. As shown in FIG. 6, the thus produced titanium oxide containing niobium has a lower density in the vicinity of the surface than at the central portion of the particle, and hence is controlled to have a core-shell-like form.

The STEM image of FIG. 6 is schematically illustrated in FIG. 7. In each of such niobium atom-containing titanium oxide particles, the niobium/titanium atomic concentration ratio in the vicinity of the surface of the particle 32 is higher than the niobium/titanium atomic concentration ratio at the central portion of the particle 31, and the niobium atom is localized in the vicinity of the surface of the particle. Specifically, the niobium/titanium atomic concentration ratio at the inside portion at 5% of the maximum diameter of the particle from the surface of the particle is 2.0 or more times as high as the niobium/titanium atomic concentration ratio at the central portion of the particle 31. When the ratio between the niobium/titanium atomic concentration ratios is set to 2.0 or more times, a charge can easily move in the protection layer, and hence the charge-injecting property can be enhanced. When the ratio between the niobium/titanium atomic concentration ratios is less than 2.0 times, a charge is not easily transferred.

The EDS analysis with the STEM involves observation with the scanning transmission electron microscope and measurement of the niobium/titanium atomic concentration ratios by EDS analysis. The niobium/titanium atomic concentration ratio at the central portion of the particle 31 can be measured by X-rays 33 analyzing the central portion of the particle. The niobium/titanium atomic concentration ratio at the inside portion at 5% of the maximum diameter of the particle from the surface of the particle can be measured by X-rays 34 analyzing the niobium/titanium atomic concentration ratio at the inside portion at 5% of the maximum diameter of the particle from the surface of the particle. In addition, the niobium/titanium atomic concentration ratios may also be directly measured from the electrophotographic photosensitive member by slicing the electrophotographic photosensitive member through use of a microtome, Ar milling, FIB, or the like.

Examples of the electroconductive particles contained in the protection layer include particles of a metal oxide, such as titanium oxide, zinc oxide, tin oxide, or indium oxide. Of those, titanium oxide is preferred. In particular, when anatase-type titanium oxide is adopted, charge movement in the protection layer is facilitated, and hence charge injection becomes satisfactory. The anatase-type titanium oxide preferably has an anatase degree of 90% or more. The metal oxide particles may each be doped with an atom of, for example, niobium, phosphorus, or aluminum, or an oxide thereof, and are particularly preferably titanium oxide particles each of which contains niobium, and has a configuration in which niobium is localized in the vicinity of the surface of the particle. The localization of niobium in the vicinity of the surface enables efficient transfer of a charge.

The use of such electroconductive particles facilitates the injection of a charge from the charging member brought into contact with the surfaces of the electroconductive particles, and also facilitates the movement of the charge in the protection layer, with the result that the suppressing effect on a reduction in resistivity of the surface of the electrophotographic photosensitive member can be obtained at a high level.

Particles each having any of various shapes, such as a spherical shape, a polyhedral shape, an ellipsoidal shape, a flaky shape, and a needle shape, may be used as the electroconductive particles. Of those, particles each having a spherical shape, a polyhedral shape, or an ellipsoidal shape are preferred, and particles each having a spherical shape or a polyhedral shape close to a spherical shape are more preferred from the viewpoint that image defects such as black spots are reduced.

The electroconductive particles preferably have a number-average particle diameter of 60 to 150 nm. When the electroconductive particles have a number-average particle diameter of 60 nm or more, the specific surface area of the electroconductive particles does not become excessively large, and hence the adsorption of moisture onto the electroconductive particles exposed on the surface of the electrophotographic photosensitive member can be suppressed. When the electroconductive particles have a number-average particle diameter of 150 nm or less, the dispersibility of the electroconductive particles in the protection layer can be increased. In addition, the area of an interface with a binder resin in the protection layer can be increased, and hence resistance between the electroconductive particles and the binder resin is reduced to increase the efficiency of movement of a charge, to thereby improve the injection chargeability of the electrophotographic photosensitive member.

In addition, the electroconductive particles are surface-treated with a compound having a silicon atom, such as a silane coupling agent or a silicone resin. Through the surface treatment, the hydrophobicity of the electroconductive particles is increased. In addition, through the surface treatment, nonuniform dispersion of the electroconductive particles in the protection layer is suppressed to suppress a reduction in resistance caused by excessive exposure of the electroconductive particles on the surface of the electrophotographic photosensitive member. As a result of the foregoing, the adsorption of moisture onto the surface of the electrophotographic photosensitive member under a high-humidity environment can be suppressed.

The compound having a silicon atom to be used for the surface treatment of the electroconductive particles preferably contains an alkyl group having 12 or less carbon atoms.

A silane coupling agent is suitably used for the surface treatment of the electroconductive particles. A compound represented by the following formula (A) may be used as the silane coupling agent.

(A)

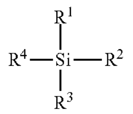

In the formula (A), $R^1$ to $R^3$ each independently represent an alkoxy group or an alkyl group, provided that at least two of $R^1$ to $R^3$ represent alkoxy groups. $R^4$ represents an alkyl group having 12 or less carbon atoms.

Examples of the compound represented by the formula (A) include hexyltrimethoxysilane, hexyltriethoxysilane, octyltrimethoxysilane, octyltriethoxysilane, decyltrimethoxysilane, dodecyltrimethoxysilane, and dodecyltriethoxysilane.

In addition, as the silane coupling agent, a silane coupling agent except the compound represented by the formula (A), such as N-2-(aminoethyl)-3-aminopropylmethyldimethoxysilane, 3-aminopropylmethyldiethoxysilane, (phenylaminomethyl)methyldimethoxysilane, N-2-(aminoethyl)-3-aminoisobutylmethyldimethoxysilane, N-ethylaminoisobutylmethyldiethoxysilane, N-methylaminopropylmethyldimethoxysilane, vinyltrimethoxysilane, 3-aminopropyltriethoxysilane, N-(2-aminoethyl)-3-aminopropyltrimethoxysilane, methyltrimethoxysilane, 3-glycidoxypropyltrimethoxysilane, 3-methacryloxypropyltrimethoxysilane, 3-chloropropyltrimethoxysilane, or 3-mercaptopropyltrimethoxysilane, may be used in combination with the compound represented by the formula (A).

A general method is used as a method of surface-treating the electroconductive particles. Examples thereof include a dry method and a wet method.

The dry method involves, while stirring the electroconductive particles in a mixer capable of high-speed stirring such as a Henschel mixer, adding an alcoholic aqueous solution, organic solvent solution, or aqueous solution containing the surface treatment agent, uniformly dispersing the mixture, and then drying the dispersion.

In addition, the wet method involves stirring the electroconductive particles and the surface treatment agent in a solvent, or dispersing the electroconductive particles and the surface treatment agent in a solvent with a sand mill or the like using glass beads or the like. After the dispersion, the solvent is removed by filtration or evaporation under reduced pressure. After the removal of the solvent, it is preferred to further perform baking at 100° C. or more.

The protection layer has a feature in that the atom concentrations of a carbon atom, an oxygen atom, a titanium atom, a niobium atom, and a silicon atom present on its surface satisfy specific conditions. That is, when at a surface of the protection layer, a total of a relative concentration d(C) of a carbon atom, a relative concentration d(O) of an oxygen atom, a relative concentration d(Ti) of the titanium atom, a relative concentration d(Nb) of the niobium atom, and a relative concentration d(Si) of the silicon atom, which are determined by X-ray photoelectron spectroscopy, is defined as 100.0 atomic %, the following expressions (1) to (3) are satisfied:

$$0<d(\mathrm{Ti})\leq 2.0 \quad (1),$$

$$0<d(\mathrm{Si})\leq 8.0 \quad (2), \text{ and}$$

$$0.01\leq d(\mathrm{Ti})/d(\mathrm{Si})\leq 1.0 \quad (3).$$

When d(Ti) is 2.0 atomic % or less, the degree of exposure of the electroconductive particles on the surface of the electrophotographic photosensitive member does not become excessively high, and hence the adsorption of moisture onto the surface of the electrophotographic photosensitive member under a high-humidity environment can be suppressed. When d(Ti) is more than 0, some electroconductive particles are exposed on the surface of the electrophotographic photosensitive member to reduce the contact potential between the surface of the electrophotographic photosensitive member and the charging member, to thereby improve the injection chargeability of the electrophotographic photosensitive member.

When d(Si) is 8.0 atomic % or less, the degree to which the electroconductive particles surface-treated with the compound having a silicon atom are exposed on the surface of the electrophotographic photosensitive member is not excessive. In addition, the ratio of a hydrophobic resin component having a silicon atom in the protection layer to be described later does not become excessively high. Accordingly, a reduction in injection chargeability of the electrophotographic photosensitive member can be suppressed. When d(Si) is more than 0, the electroconductive particles hydrophobized with the compound having a silicon atom are exposed on the surface of the electrophotographic photosensitive member, or the binder resin contains the hydrophobic resin component having a silicon atom. Consequently, the adsorption of moisture onto the surface of the electrophotographic photosensitive member under a high-humidity environment can be suppressed.

When d(Ti)/d(Si) is 0.01 or more, the surface treatment of the electroconductive particles with the compound having a silicon atom is not excessive, and hence an excessively increase in resistivity of the protection layer can be suppressed, with the result that a reduction in injection chargeability of the electrophotographic photosensitive member can be suppressed. When d(Ti)/d(Si) is 1.0 or less, the wettability of the binder resin in the protection layer with respect to the surfaces of the electroconductive particles can be sufficiently increased, and hence the dispersibility of the electroconductive particles in the protection layer is improved. With this configuration, the charging uniformity of the electrophotographic photosensitive member is improved, and besides, excessive exposure of the electroconductive particles on the surface of the electrophotographic photosensitive member can be suppressed to suppress the adsorption of moisture onto the surface of the electrophotographic photosensitive member under a high-humidity environment.

The content ratio of the electroconductive particles in the protection layer is 5 vol % or more and less than 40 vol % with respect to the total volume of the protection layer. When the content ratio of the electroconductive particles in the protection layer is 5 vol % or more, the injection chargeability of the electrophotographic photosensitive member can be sufficiently improved. In addition, when the content ratio of the electroconductive particles in the protection layer is less than 40 vol %, the adsorption of moisture onto the surface of the electrophotographic photosensitive member under a high-humidity environment can be suppressed.

The protection layer may contain: a polymerization product of a compound having a polymerizable functional group; and a resin. Examples of the polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, a carbon-carbon double bond group, an alkoxysilyl group, and a silanol group. A monomer having a charge-transporting ability may be used as the compound having a polymerizable functional group. The compound having a polymerizable functional group may have a charge-transportable structure as well as a chain-polymerizable functional group.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred. In addition, the protection layer may be formed as a cured film by polymerizing a composition containing a monomer having a polymerizable functional group. A reaction in this case is, for example, a thermal polymerization reaction, a photopolymerization reaction, or a radiation polymerization reaction. Examples of the polymerizable functional group of the monomer having a polymerizable functional group include an acrylic group and a methacrylic group. A material having a charge-transporting ability may be used as the monomer having a polymerizable functional group.

In addition, the protection layer may contain a resin having a silicon atom.

An example of the resin having a silicon atom that may be incorporated into the protection layer is a silicone oil. Examples of the silicone oil include a straight silicone oil and a modified silicone oil. Examples of the straight silicone oil include a dimethyl silicone oil, a methyl phenyl silicone oil, and a methyl hydrogen silicone oil. Examples of the modified silicone oil include: reactive silicone oils, such as amino-modified, epoxy-modified, carboxy-modified, carbinol-modified, methacryl-modified, mercapto-modified, and phenol-modified silicone oils; and non-reactive silicone oils, such as polyether-modified, methyl styryl-modified, alkyl-modified, ester-modified, and fluorine-modified silicone oils. Further, a block polymer or graft polymer having a polydimethylsiloxane structure introduced into a side chain or main chain thereof may be used as the resin having a silicon atom.

The protection layer may contain an additive, such as an antioxidant, a UV absorber, a plasticizer, a leveling agent, a slipperiness-imparting agent, or an abrasion resistance-improving agent. Specific examples of the additive include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protection layer may be formed by preparing a coating liquid for a protection layer containing the above-mentioned materials and a solvent, forming a coat thereof on the photosensitive layer, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

The protection layer has a thickness of preferably 0.2 to 5 μm, more preferably 0.5 to 3 μm.

The protection layer preferably satisfies the following conditions regarding its volume resistivity from the viewpoint of the charge retentivity of the electrophotographic photosensitive member. That is, it is preferred that, when a volume resistivity of the protection layer under an atmosphere at 23° C. and 50% RH is represented by A [Ω·cm] and a volume resistivity of the protection layer under an atmosphere at 32.5° C. and 80% RH is represented by B [Ω·cm], the following expressions (4) to (6) be satisfied.

$$11 \leq \log A \leq 14 \quad (4)$$

$$11 \leq \log B \leq 14 \quad (5)$$

$$0 < \log(A/B) \leq 2.0 \quad (6)$$

When log A is 11 or more, the adsorption of moisture onto the surface of the electrophotographic photosensitive member under the atmosphere at 23° C. and 50% RH can be suppressed. When log A is 14 or less, the resistivity of the protection layer is not excessively high, and hence a reduction in injection chargeability of the electrophotographic photosensitive member can be suppressed.

When log B is 11 or more, the adsorption of moisture onto the surface of the electrophotographic photosensitive member under the atmosphere at 32.5° C. and 80% RH can be suppressed. When log B is 14 or less, the resistivity of the protection layer is not excessively high, and hence a reduction in injection chargeability of the electrophotographic photosensitive member can be suppressed. In order to alleviate the influence of a fluctuation in volume resistivity accompanying a change in temperature and humidity environment, it is preferred that log (A/B) be 2.0 or less. It is more preferred that log (A/B) be 1.5 or less.

This measurement involves measuring a minute current amount, and hence is preferably performed using, as a resistance-measuring apparatus, an instrument capable of measuring a minute current. An example of the resistance-measuring apparatus capable of measuring a minute current is a picoammeter 4140B manufactured by Hewlett-Packard Company. The comb-shaped electrodes to be used and the voltage to be applied are preferably selected in accordance with the material and resistance value of the protection layer so that an appropriate SN ratio may be obtained.

The protection layer preferably has a charge retentivity of 9.5 or more, and more preferably has a charge retentivity of 10.0 or more. Herein, the charge retentivity is a value obtained by applying a rectangular wave-shaped charge to the surface of the electrophotographic photosensitive member and measuring a temporal change in shape thereof.

Through determination of the value of the charge retentivity, the stable retentivity of a charge on the surface of the electrophotographic photosensitive member, that is, the stability of an electrostatic latent image formed on the surface of the electrophotographic photosensitive member can be evaluated in a simplified manner. Image smearing occurs owing to the disturbance of the electrostatic latent image, and hence the degree of suppression of image smearing may be evaluated by evaluating the charge retentivity.

<Support>

The support included in the electrophotographic photosensitive member according to the present invention is an electroconductive support having electroconductivity. Examples of the shape of the support include a cylindrical shape, a belt shape, and a sheet shape. Of those, a cylindrical shape is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, when the resin or the glass is used as the material for the support, electroconductivity is imparted thereto through treatment involving, for example, mixing or coating with an electroconductive material.

<Electroconductive Layer>

In the electrophotographic photosensitive member according to the present invention, the arrangement of the electroconductive layer can conceal flaws and unevenness in the surface of the support, and control the reflection of light on the surface of the support. The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, bismuth oxide, and barium sulfate. Examples of the metal include aluminum, nickel, iron, nichrome, copper, zinc, and silver.

Of those, the metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, the electroconductive particles may each have a laminated configuration in which a particle formed of a metal oxide is coated with a metal oxide, such as tin oxide or titanium oxide.

In addition, when the metal oxide is used as the electroconductive particles, their number-average particle diameter is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer may be formed by preparing a coating liquid for an electroconductive layer containing the above-mentioned materials and a solvent, forming a coat thereof on the support, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision-type high-speed disperser.

The electroconductive layer has a thickness of preferably 1 to 40 μm, particularly preferably 3 to 30 μm.

<Undercoat Layer>

In the present invention, the arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron-transporting substance, a metal oxide, a metal, an electroconductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

The metal oxide particles to be incorporated into the undercoat layer may be surface-treated with a surface treatment agent such as a silane coupling agent before use. A general method is used as a method of surface-treating the metal oxide particles. Examples thereof include a dry method and a wet method.

The dry method involves, while stirring the metal oxide particles in a mixer capable of high-speed stirring such as a Henschel mixer, adding an alcoholic aqueous solution, organic solvent solution, or aqueous solution containing the surface treatment agent, uniformly dispersing the mixture, and then drying the dispersion.

In addition, the wet method involves stirring the metal oxide particles and the surface treatment agent in a solvent, or dispersing the metal oxide particles and the surface treatment agent in a solvent with a sand mill or the like using glass beads or the like. After the dispersion, the solvent is removed by filtration or evaporation under reduced pressure. After the removal of the solvent, it is preferred to further perform baking at 100° C. or more.

The undercoat layer may further contain an additive, and for example, may contain a known material, such as: powder of a metal such as aluminum; an electroconductive substance such as carbon black; a charge-transporting substance; a metal chelate compound; or an organometallic compound.

Examples of the charge-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. A charge-transporting substance having a polymerizable functional group may be used as the charge-transporting substance and copolymerized with the above-mentioned monomer having a polymerizable functional group to form the undercoat layer as a cured film.

The undercoat layer may be formed by preparing a coating liquid for an undercoat layer containing the above-mentioned materials and a solvent, forming a coat thereof on the support or the electroconductive layer, and drying and/or curing the coat.

Examples of the solvent to be used for the coating liquid for an undercoat layer include organic solvents, such as an alcohol, a sulfoxide, a ketone, an ether, an ester, an aliphatic halogenated hydrocarbon, and an aromatic compound. In the present invention, alcohol-based and ketone-based solvents are preferably used.

A dispersion method for preparing the coating liquid for an undercoat layer is, for example, a method involving using a homogenizer, an ultrasonic disperser, a ball mill, a sand mill, a roll mill, a vibration mill, an attritor, or a liquid collision-type high-speed disperser.

The undercoat layer has a thickness of preferably 0.1 to 10 μm, more preferably 0.1 to 5 μm.

<Photosensitive Layer>

The photosensitive layers of the electrophotographic photosensitive member are mainly classified into (1) a laminate-type photosensitive layer and (2) a monolayer-type photosensitive layer. (1) The laminate-type photosensitive layer is a photosensitive layer having a charge-generating layer containing a charge-generating substance and a charge-transporting layer containing a charge-transporting substance. (2) The monolayer-type photosensitive layer is a photosensitive layer containing both a charge-generating substance and a charge-transporting substance.

(1) Laminate-type Photosensitive Layer

The laminate-type photosensitive layer has the charge-generating layer and the charge-transporting layer.

(1-1) Charge-generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 to 85 mass %, more preferably 60 to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer may be formed by preparing a coating liquid for a charge-generating layer containing the above-mentioned materials and a solvent, forming a coat thereof on the undercoat layer, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

The charge-generating layer has a thickness of preferably 0.1 to 1 μm, more preferably 0.15 to 0.4 μm.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 to 70 mass %, more preferably 30 to 55 mass % with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably 4:10 to 20:10, more preferably 5:10 to 12:10.

In addition, the charge-transporting layer may contain an additive, such as an antioxidant, a UV absorber, a plasticizer, a leveling agent, a slipperiness-imparting agent, or an abrasion resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge-transporting layer may be formed by preparing a coating liquid for a charge-transporting layer containing the above-mentioned materials and a solvent, forming a coat thereof on the charge-generating layer, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

The charge-transporting layer has a thickness of 3 to 50 μm, more preferably 5 to 40 particularly preferably 10 to 30

(2) Monolayer-Type Photosensitive Layer

The monolayer-type photosensitive layer may be formed by preparing a coating liquid for a photosensitive layer containing the charge-generating substance, the charge-transporting substance, a resin, and a solvent, forming a coat thereof on the undercoat layer, and drying the coat. Examples of the charge-generating substance, the charge-transporting substance, and the resin are the same as those of the materials in the section "(1) Laminate-type Photosensitive Layer."

The monolayer-type photosensitive layer has a thickness of preferably 10 to 45 more preferably 25 to 35 μm

[Process Cartridge and Electrophotographic Apparatus]

A process cartridge according to the present invention has a feature of integrally supporting the electrophotographic photosensitive member described in the foregoing, and at least one unit selected from the group consisting of: a charging unit; a developing unit; and a cleaning unit, and being detachably attachable onto the main body of an electrophotographic apparatus.

In addition, an electrophotographic apparatus according to the present invention has a feature of including: the electrophotographic photosensitive member described in the foregoing; a charging unit; an exposing unit; a developing unit; and a transfer unit.

Figure 5:
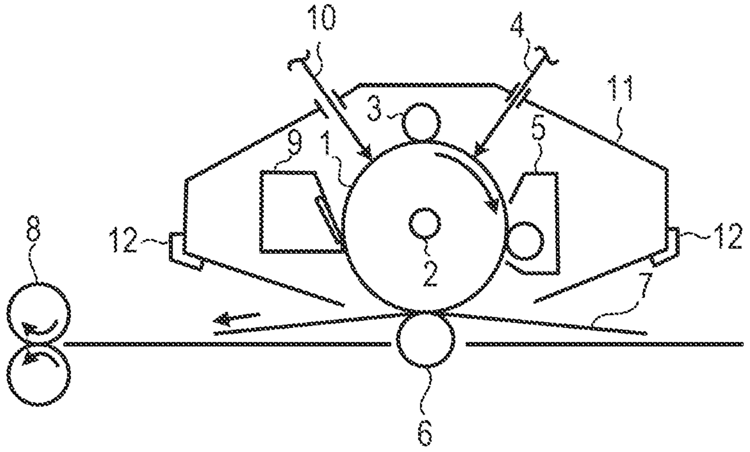
FIG. 5 is a view for illustrating an example of the schematic configuration of a process cartridge including the electrophotographic photosensitive member according to the present invention and an electrophotographic apparatus including the process cartridge.

An example of the schematic configuration of an electrophotographic apparatus including a process cartridge including an electrophotographic photosensitive member is illustrated in FIG. 5.

An electrophotographic photosensitive member 1 of a cylindrical shape (drum shape) is rotationally driven about a shaft 2 in a direction indicated by the arrow at a predetermined peripheral speed (process speed). The surface of the electrophotographic photosensitive member 1 is charged to a predetermined positive or negative potential by a charging unit 3 in the rotational process. In FIG. 5, a roller charging system based on a roller-type charging member is illustrated, but a charging system, such as a corona charging system, a proximity charging system, or an injection charging system, may be adopted. The charged surface of the electrophotographic photosensitive member 1 is irradiated with exposure light 4 from an exposing unit (not shown), and hence an electrostatic latent image corresponding to target image information is formed thereon.

The exposure light 4 is light whose intensity has been modulated in correspondence with a time-series electric digital image signal of information on a target image, and is emitted, for example, from an image exposing unit, such as slit exposure or laser beam scanning exposure.

The electrostatic latent image formed on the surface of the electrophotographic photosensitive member 1 is developed (normal development or reversal development) with toner stored in a developing unit 5 to form a toner image on the surface of the electrophotographic photosensitive member 1.

The toner image formed on the surface of the electrophotographic photosensitive member 1 is transferred by a transfer unit 6 onto a transfer material 7. At this time, a bias voltage opposite in polarity to charge that the toner possesses is applied from a bias power source (not shown) to the transfer unit 6. In addition, when the transfer material 7 is paper, the transfer material 7 is taken out of a sheet feeding portion (not shown) and supplied to a space between the electrophotographic photosensitive member 1 and the transfer unit 6 in synchronization with the rotation of the electrophotographic photosensitive member 1.

The transfer material 7 onto which the toner image has been transferred from the electrophotographic photosensitive member 1 is separated from the surface of the electrophotographic photosensitive member 1, is conveyed to a fixing unit 8, and is subjected to treatment for fixing the toner image to be printed out as an image-formed product (a print or a copy) to the outside of the electrophotographic apparatus.

The electrophotographic apparatus may include a cleaning unit 9 for removing a deposit such as the toner remaining on the surface of the electrophotographic photosensitive member after the transfer. In addition, a so-called cleanerless system configured to remove the deposit with the developing unit 5 or the like without separate arrangement of the cleaning unit 9 may be used.

For example, such a configuration as described below is adopted. At least one selected from the charging unit 3, the developing unit 5, and the cleaning unit 9 is integrally supported with the electrophotographic photosensitive member to form a cartridge. The cartridge may be used as a process cartridge 11 to be detachably attachable onto the main body of the electrophotographic apparatus with a guiding unit 12 such as a rail of the main body of the electrophotographic apparatus.

The electrophotographic apparatus may include an electricity-removing mechanism for subjecting the surface of the electrophotographic photosensitive member to electricity-removing treatment with pre-exposure light 10 from a pre-exposing unit (not shown). In addition, the guiding unit 12 such as the rail may be arranged for detachably attaching the process cartridge 11 onto the main body of the electrophotographic apparatus.

The electrophotographic photosensitive member according to the present invention can be used in, for example, a laser beam printer, an LED printer, a copying machine, a facsimile, and a multifunctional peripheral thereof.

According to the present invention, the electrophotographic photosensitive member excellent in suppression of image smearing and in charging uniformity, the process cartridge including such electrophotographic photosensitive member, and the electrophotographic apparatus including such electrophotographic photosensitive member can be provided.

EXAMPLES

The present invention is described in more detail below by way of Examples and Comparative Examples. The present invention is by no means limited to the following Examples, and various modifications may be made without departing from the gist of the present invention. In the description in the following Examples, the term "part(s)" is by mass unless otherwise specified.

Measurement methods for various physical properties of the electrophotographic photosensitive member according to the present invention and the electroconductive particles are described below.

<Measurement of Physical Properties of Electrophotographic Photosensitive Member>

<Calculation of Primary Particle Diameter of Electroconductive Particles>

First, the electrophotographic photosensitive member was entirely immersed in methyl ethyl ketone (MEK) in a graduated cylinder and irradiated with an ultrasonic wave to peel off resin layers, and then the substrate of the electrophotographic photosensitive member was taken out. Next, insoluble matter that did not dissolve in MEK (the photosensitive layer and the protection layer containing the electroconductive particles) was filtered, and was brought to dryness with a vacuum dryer. Further, the resultant solid was suspended in a mixed solvent of tetrahydrofuran (THF)/methylal at a volume ratio of 1:1, insoluble matter was filtered, and then the filtration residue was recovered and brought to dryness with a vacuum dryer. Through this operation, the electroconductive particles and the resin of the protection layer were obtained. Further, the filtration residue was heated in an electric furnace to 500° C. so as to leave only the electroconductive particles as solids, and the electroconductive particles were recovered. In order to secure an amount of the electroconductive particles required for measurement, a plurality of electrophotographic photosensitive members were similarly treated.

Part of the recovered electroconductive particles were dispersed in isopropanol (IPA), and the dispersion liquid was dropped onto a grid mesh with a support membrane (manufactured by JEOL Ltd., Cu150J), followed by the observation of the electroconductive particles in the STEM mode of a scanning transmission electron microscope (JEOL Ltd., JEM2800). The observation was performed at a magnification of 500,000 to 1,200,000 times so as to facilitate the calculation of the particle diameter of the electroconductive particles, and STEM images of 100 electroconductive particles were taken. At this time, the following settings were adopted: an acceleration voltage of 200 kV, a probe size of 1 nm, and an image size of 1,024×1,024 pixels. With use of the resultant STEM images, a primary particle diameter was measured with image processing software "Image-Pro Plus (manufactured by Media Cybernetics, Inc.)." First, a scale bar displayed in the lower portion of the STEM image is selected using the straight line tool (Straight Line) of the tool bar. When the Set Scale of the Analyze menu is selected under the state, a new window is opened, and the pixel distance of a selected straight line is input in the "Distance in Pixels" column. The value (e.g., 100) of the scale bar is input in the "Known Distance" column of the window, and the unit (e.g., nm) of the scale bar is input in the "Unit of Measurement" column, followed by the clicking of OK. Thus, scale setting is completed. Next, a straight line was drawn so as to coincide with the maximum diameter of an electroconductive particle using the straight line tool, and the particle diameter was calculated. The same operation was performed for 100 electroconductive particles, and the number average of the resultant values (maximum diameters) was adopted as the primary particle diameter of the electroconductive particles.

<Calculation of Niobium Atom/Titanium Atom Concentration Ratio in Electroconductive Particles contained in Electrophotographic Photosensitive Member>

One 5 mm square sample piece was cut out of the photosensitive member, and was cut to a thickness of 200 nm with an ultrasonic ultramicrotome (Leica, UC7) at a cutting speed of 0.6 mm/s to produce a slice sample. The slice sample was observed at a magnification of 500,000 to 1,200,000 times in the STEM mode of a scanning transmission electron microscope (JEOL Ltd., JEM2800) having connected thereto an EDS analyzer (energy-dispersive X-ray spectrometer).

Of the cross-sections of the electroconductive particles observed, cross-sections of electroconductive particles each having a maximum diameter that was about 0.9 to 1.1 times as large as the primary particle diameter calculated in the foregoing were selected through visual observation. Subsequently, spectra of the constituent elements of the selected cross-sections of electroconductive particles were collected using the EDS analyzer to produce EDS mapping images. The collection and analysis of the spectra were performed using NSS (Thermo Fisher Scientific). Collection conditions were set to an acceleration voltage of 200 kV, a probe size of 1.0 nm or 1.5 nm appropriately selected so as to achieve a dead time of 15 to 30, a mapping resolution of 256×256, and a Frame number of 300. The EDS mapping images were obtained for 100 cross-sections of electroconductive particles.

The thus obtained EDS mapping images are each analyzed to calculate a ratio between a niobium atom concentration (atomic %) and a titanium atom concentration (atomic %) at each of the central portion of a particle and an inside portion at 5% of the maximum diameter of a measurement particle from the surface of the particle. Specifically, first, the "Line Extraction" button of NSS is pressed to draw a straight line so as to coincide with the maximum diameter of the particle, and information is obtained on an atom concentration (atomic %) on the straight line extending from one surface, passing through the inside of the particle, and reaching the other surface. When the maximum diameter of the particle obtained at this time fell within the range of less than 0.9 times or more than 1.1 times the primary particle diameter calculated in the foregoing, the particle was excluded from the subsequent analysis. (Only particles each having a maximum diameter in the range of 0.9 vol % or more and less than 1.1 times the primary particle diameter were subjected to the analysis described below.) Next, on the surfaces on both sides of the particle, the niobium atom concentration (atomic %) at the inside portion at 5% of the maximum diameter of the measurement particle from the surface of the particle is read. Similarly, the "titanium atom concentration (atomic %) at the inside portion at 5% of the maximum diameter of the measurement particle from the surface of the particle" is obtained. Then, with use of those values, the "concentration ratio between the niobium atom and the titanium atom at the inside portion at 5% of the maximum diameter of the measurement particle from the surface of the particle" is obtained from the following equation for each of the surfaces on both sides of the particle.

Concentration ratio between niobium atom and titanium atom at inside portion at 5% of maximum diameter of measurement particle from surface of particle=(niobium atom concentration (atomic %) at inside portion at 5% of maximum diameter of measurement particle from surface of particle)/(titanium atom concentration (atomic %) at inside portion at 5% of maximum diameter of measurement particle from surface of particle)

Of the two concentration ratios obtained, the one with a smaller value is adopted as the "concentration ratio between the niobium atom and the titanium atom at the inside portion at 5% of the maximum diameter of the measurement particle from the surface of the particle" in the present invention.

In addition, a niobium atom concentration (atomic %) and a titanium atom concentration (atomic %) at a position located on the above-mentioned straight line and coinciding with the middle point of the maximum diameter are read. With use of those values, the "concentration ratio between the niobium atom and the titanium atom at the central portion of the particle" is obtained from the following equation.

Concentration ratio between niobium atom and titanium atom at central portion of particle=(niobium atom concentration (atomic %) at central portion of particle)/(titanium atom concentration (atomic %) at central portion of particle)

The "concentration ratio calculated as niobium atom concentration/titanium atom concentration at the inside portion at 5% of the maximum diameter of the measurement particle from the surface of the particle relative to the concentration ratio calculated as niobium atom concentration/titanium atom concentration at the central portion of the particle" is calculated by the following equation.

(Concentration ratio between niobium atom and titanium atom at inside portion at 5% of maximum diameter of measurement particle from surface of particle)/(concentration ratio between niobium atom and titanium atom at central portion of particle)

<Calculation of Content of Electroconductive Particles>

Next, four 5 mm square sample pieces were cut out of the photosensitive member, and the protection layer was reconstructed into a three-dimensional object of 2 μm×2 μm×2 μm with Slice&View of FIB-SEM. Based on a difference in contrast of Slice&View of FIB-SEM, the content of the electroconductive particles in the total volume of the protection layer was calculated. The conditions of Slice&View were set as described below.

Processing of sample for analysis: FIB method

Processing and observation apparatus: NVision40 manufactured by SII/Zeiss

Slice interval: 10 nm

Observation conditions:
Acceleration voltage: 1.0 kV
Sample tilt: 54°
WD: 5 mm
Detector: BSE detector
Aperture: 60 μm, high current
ABC: ON
Image resolution: 1.25 nm/pixel An analysis region is set to 2 μm long by 2 μm wide, and information for each cross-section is integrated to determine a volume V per 2 μm length×2 μm width×2 μm thickness (8 $\mu m^3$). In addition, a measurement environment has a temperature of 23° C. and a pressure of $1\times10^{-4}$ Pa. Strata 400S manufactured by FEI (sample tilt: 52°) may also be used as the processing and observation apparatus. In addition, the information for each cross-section was obtained through image analysis of the area of an identified electroconductive particle of the present invention. The image analysis was performed using image processing software: Image-Pro Plus manufactured by Media Cybernetics, Inc.

Based on the resultant information, in each of the four sample pieces, the volume V of the electroconductive particles of the present invention in a volume of 2 μm×2 μm×2 μm (unit volume: 8 $\mu m^3$) was determined, and the content [vol %] of the electroconductive particles (=V $\mu m^3$/8 $\mu m^3$×100) was calculated. The average of the values of the content of the electroconductive particles in the four sample pieces was defined as the content [vol %] of the electroconductive particles of the present invention in the protection layer with respect to the total volume of the protection layer.

At this time, all of the four sample pieces were processed to a boundary between the protection layer and the underlying layer to measure the thickness "t" (cm) of the protection layer, and the value of the thickness of the protection layer was used for the calculation of a volume resistivity ρs in the <measurement method for the volume resistivity of the protection layer of the photosensitive member> described below.

<Measurement of Relative Concentration of Each Atom at Surface of Protection Layer>

X-ray photoelectron spectroscopy for the surface of the protection layer may be specifically performed as described below.

First, five 5 mm square sections are cut out of randomly selected positions on the surface of the electrophotographic photosensitive member to prepare five sample pieces for observation. Subsequently, X-ray photoelectron spectroscopy (XPS) is performed for the protection layer of each of the sample pieces for observation. An apparatus and measurement conditions for the XPS are as described below.

Apparatus used: Quantum 2000 manufactured by ULVAC-PHI, Inc.
Analysis method: narrow analysis
X-ray source: Al-Kα
X-ray conditions: 100 μm, 25 W, 15 kV
Photoelectron acceptance angle: 45°
Pass Energy: 58.70 eV
Measurement range: φ100 μm Measurement is performed under the above-mentioned conditions, and a peak derived from a C—C bond of carbon is orbitals is corrected to 285 eV. After that, a relative sensitivity factor provided by ULVAC-PHI, Inc. is applied to the peak area of an atom having a peak top detected at 100 to 103 eV. The results obtained for the five sample pieces for observation are averaged, and the respective spectral peaks of a carbon atom, an oxygen atom, a titanium atom, a niobium atom, and a silicon atom are integrated and converted. The relative concentration d(C) of the carbon atom, the relative concentration d(O) of the oxygen atom, the relative concentration d(Ti) of the titanium atom, the relative concentration d(Nb) of the niobium atom, and the relative concentration d(Si) of the silicon atom are determined with respect to 100.0 atomic % of the total of the relative concentration d(Ti) of the titanium atom, the relative concentration d(Nb) of the niobium atom, and the relative concentration d(Si) of the silicon atom. The atomic concentration ratio d(Nb)/d(Ti) of the niobium atom to the titanium atom in the metal oxide, d(Ti), d(Si), and d(Ti)/d(Si) were calculated.

<Measurement of Relative Concentration of Each Atom at Surface of each of Electroconductive Particles>

X-ray photoelectron spectroscopy for the surface of each of the electroconductive particles may be specifically performed as described below. X-ray photoelectron spectroscopy (XPS) is performed for the electroconductive particles. An apparatus and measurement conditions for the XPS are as described below.

Apparatus used: Quantum 2000 manufactured by ULVAC-PHI, Inc.
Analysis method: narrow analysis
X-ray source: Al-Kα
X-ray conditions: 100 μm 25 W, 15 kV
Photoelectron acceptance angle: 45°
Pass Energy: 58.70 eV
Measurement range: φ100 μm Measurement is performed under the above-mentioned conditions, and a peak derived from a C—C bond of carbon is orbitals is corrected to 285 eV. After that, a relative sensitivity factor provided by ULVAC-PHI, Inc. is applied to the peak area of an atom having a peak top detected at 100 to 103 eV. The obtained results are averaged, and the respective spectral peaks of a carbon atom, an oxygen atom, a titanium atom, a niobium atom, and a silicon atom are integrated and converted. The relative concentration d(C) of the carbon atom, the relative concentration d(0) of the oxygen atom, the relative concentration d(Ti) of the titanium atom, the relative concentration d(Nb) of the niobium atom, and the relative concentration d(Si) of the silicon atom are determined with respect to 100.0 atomic % of the total of the relative concentration d(Ti) of the titanium atom, the relative concentration d(Nb) of the niobium atom, and the relative concentration d(Si) of the silicon atom. The atomic concentration ratio d(Nb)/d(Ti) of the niobium atom to the titanium atom in the metal oxide was calculated.

<Measurement Method for Volume Resistivity of Protection Layer>

The volume resistivity of the protection layer may be measured as described below.

Figure 2:
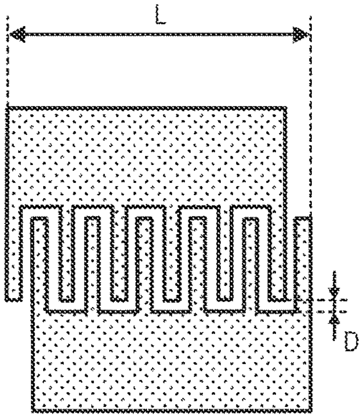
FIG. 2 is a view for illustrating an example of comb-shaped electrodes to be used for the measurement of the volume resistivity of the electrophotographic photosensitive member.

A picoampere (pA) meter is used for the measurement of the volume resistivity. First, such comb-shaped gold electrodes as illustrated in FIG. 2, which have an electrode-to-electrode distance (D) of 180 μm and a length (L) of 59 mm, are produced on a PET film by vapor deposition. A protection layer having a thickness (Ti) of 2 μm is formed on the produced comb-shaped gold electrodes so as to cover the comb-shaped gold electrodes. Next, under each of an environment having a temperature of 23° C. and a humidity of 50% RH and an environment having a temperature of 32.5° C. and a humidity of 80% RH, a DC current (I) at the time of the application of a DC voltage (V) of 100 V between the comb-shaped electrodes is measured. With use of the resultant measurement values, a volume resistivity A (temperature: 23° C./humidity: 50% RH) and a volume resistivity B (temperature: 32.5° C./humidity: 80% RH) are obtained by the following equation (7).

$$\text{Volume resistivity } \rho v(\Omega\cdot\text{cm}) = V(V) \times T1(\text{cm}) \times L(\text{cm}) / \{I(A) \times D(\text{cm})\} \quad (7)$$

When the composition, including the electroconductive particles and the binder resin, of the protection layer is difficult to identify, the surface resistivity of the surface of the electrophotographic photosensitive member is measured and converted into the volume resistivity. That is, when the volume resistivity of not the protection layer alone, but the protection layer existing as the surface layer of the electrophotographic photosensitive member is measured, the surface resistivity of the protection layer is measured and the resultant value is converted into the volume resistivity.

Specifically, such comb-shaped electrodes having an electrode-to-electrode distance (D) of 180 μm and a length (L) of 59 mm as illustrated in FIG. 2 are produced by gold vapor deposition on the surface of the electrophotographic photosensitive member (surface of the protection layer). Next, under each of an environment having a temperature of 23° C. and a humidity of 50% RH and an environment having a temperature of 32.5° C. and a humidity of 80% RH, a DC current (I) at the time of the application of a DC voltage (V) of 1,000 V between the comb-shaped electrodes is measured, and the surface resistivity ρs of the protection layer is calculated from DC voltage (V)/DC current (I).

The volume resistivity may be obtained by the following equation (8) using the resultant surface resistivity ρs and the thickness "t" (cm) of the protection layer.

$$\rho v = \rho s \times t \quad (8)$$

(ρv: volume resistivity, ρs: surface resistivity, t: thickness of protection layer)

(Measurement of Volume Resistivity of Protection Layer)

The volume resistivity A (temperature: 23° C./humidity: 50% RH) and volume resistivity B (temperature: 32.5° C./humidity: 80% RH) of each electrophotographic photosensitive member were obtained.

<Powder X-ray Diffraction Measurement of Electroconductive Particles>

Whether the electroconductive particles contained anatase-type titanium oxide, rutile-type titanium oxide, or tin oxide was recognized by performing powder X-ray diffraction analysis under the conditions described below. The recovery of the electroconductive particles contained in the protection layer of the electrophotographic photosensitive member was performed in conformity with the method described in the above-mentioned (measurement of the atomic concentration ratio of the niobium atom to the titanium atom in the metal oxide that the electroconductive particles each contain in its surface).

Based on a chart obtained by powder X-ray diffraction analysis using a CuKα X-ray, each metal oxide was identified with reference to the inorganic material database (AtomWork) of the National Institute for Materials Science (NIMS).

<Measurement Conditions>

Measurement apparatus used: X-ray diffraction apparatus RINT-TTRII (manufactured by Rigaku Corporation)
X-ray tube bulb: Cu
Tube voltage: 50 KV
Tube current: 300 mA
Scan method: 2θ/θ scan
Scan speed: 4.0°/min
Sampling interval: 0.02°

Start angle (2θ): 5.0°
Stop angle (2θ): 40.0°
Attachment: standard sample holder
Filter: not used
Incident monochrometer: used
Counter monochrometer: not used
Divergent slit: open
Divergent longitudinal restriction slit: 10.00 mm
Scattering slit: open
Light-receiving slit: open
Flat sheet monochrometer: used
Counter: scintillation counter (Evaluation of Charge Retentivity)

Specifically, charge retentivity may be determined as described below.

A photosensitive member test apparatus (product name: CYNTHIA59, manufactured by Gentec Co., Ltd.) is used for the measurement of charge retentivity. Under an environment having a temperature of 23° C. and a humidity of 50% RH and under an environment having a temperature of 32.5° C. and a humidity of 80% RH, the electrophotographic photosensitive member is mounted onto the above-mentioned apparatus. In addition, an electroconductive rubber roller having a diameter of 8 mm is used as a charging member, and a charging device is set so as to be capable of applying a rectangular wave at a frequency of 1 Hz, Voffset=−450 V, and Vpp=500 V to the surface of the electrophotographic photosensitive member.

In addition, a surface potential probe (model 6000B-8: manufactured by Trek Japan) is placed at a position at a distance of 1 mm from the photosensitive member, and a potential is measured using a surface potentiometer (model 344: manufactured by Trek Japan).

Figure 3:
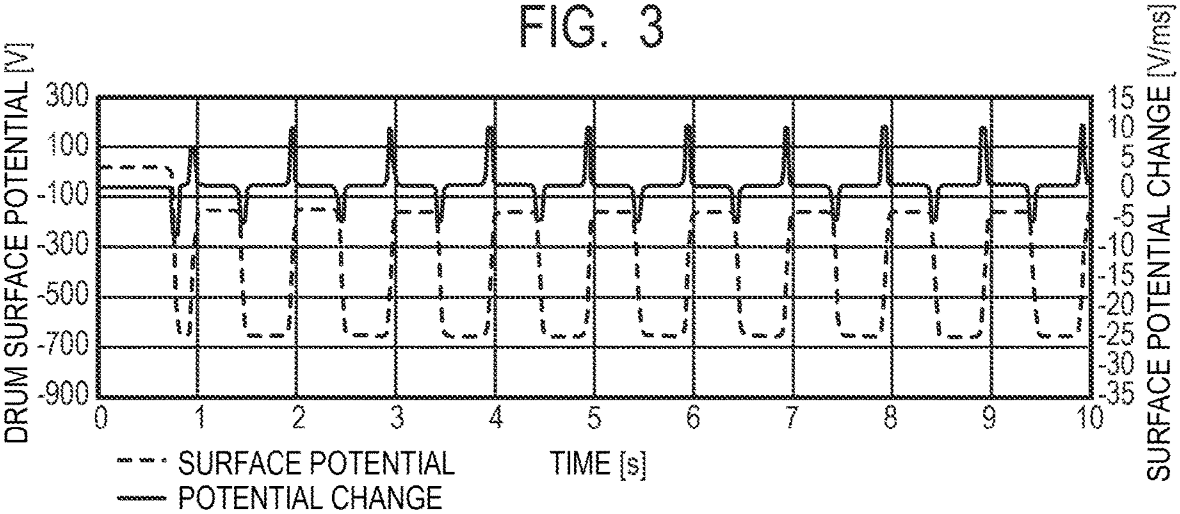
FIG. 3 is a graph showing an example of the results of potential measurement in the evaluation of charge retentivity.
Figure 4:
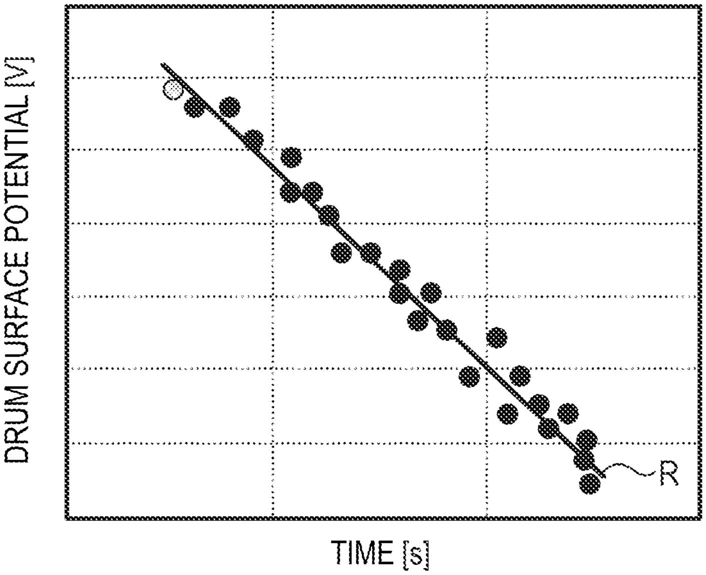
FIG. 4 is a graph for describing a calculation method in the evaluation of charge retentivity.

The electrophotographic photosensitive member is charged while being rotated at a rotation speed of 30 rpm, and a surface potential at a position rotated by 0.30 second from the charging position is obtained at intervals of 100 μs to provide such a plot as shown in FIG. 3. Subsequently, as shown in FIG. 4, the slope of a regression line R obtained from each measurement point and subsequent 24 measurement points, i.e., a total of 25 measurement points is determined. After that, a value obtained by averaging the respective absolute values of the maximum and minimum of the values of the slopes of the regression lines R obtained for respective measurement points is calculated, and the calculated value is defined as the charge retentivity.

(Production Examples of Anatase-type Titanium Oxide Particles 1 to 5)

Anatase-type titanium oxide particles may be produced by a known sulfuric acid method. In the production of titanium oxide, a solution containing titanium sulfate and titanyl sulfate as titanium compounds is hydrolyzed through heating to produce a hydrous titanium dioxide slurry, and the titanium dioxide slurry is dewatered and fired. Thus, anatase-type titanium oxide having an anatase degree of nearly 100% is obtained.

Anatase-type titanium oxide particles 1 to 5 were produced by controlling the solution concentration of titanyl sulfate in the above-mentioned method.

(Production Example of Anatase-type Titanium Oxide Particles 6)

Niobium sulfate (water-soluble niobium compound) was added to a hydrous titanium dioxide slurry obtained by hydrolyzing an aqueous solution of titanyl sulfate. With regard to its addition amount, niobium sulfate was added at a ratio of 1.8 mass % in terms of niobium ions with respect to the amount of titanium (in terms of titanium dioxide) in the slurry.

Niobium sulfate was added to an aqueous solution of titanyl sulfate at a ratio of 1.8 mass % in terms of niobium ions, and the mixture was hydrolyzed to provide a hydrous titanium dioxide slurry. Next, the hydrous titanium dioxide slurry containing niobium ions and the like was dewatered and fired at a firing temperature of 1,000° C. Thus, anatase-type titanium oxide particles 6 each containing 1.8 mass % of a niobium element were obtained.

(Production Example of Anatase-type Titanium Oxide Particles 7)

Niobium sulfate (water-soluble niobium compound) was added to a hydrous titanium dioxide slurry obtained by hydrolyzing an aqueous solution of titanyl sulfate. With regard to its addition amount, niobium sulfate was added at a ratio of 0.2 mass % in terms of niobium ions with respect to the amount of titanium (in terms of titanium dioxide) in the slurry.

Niobium sulfate was added to an aqueous solution of titanyl sulfate at a ratio of 0.2 mass % in terms of niobium ions, and the mixture was hydrolyzed to provide a hydrous titanium dioxide slurry. Next, the hydrous titanium dioxide slurry containing niobium ions and the like was dewatered and fired at a firing temperature of 1,000° C. Thus, anatase-type titanium oxide particles 7 each containing 0.2 mass % of a niobium element were obtained.

(Production Example of Rutile-type Titanium Oxide Particles 1)

200 Parts by mass of titanium oxide nanoparticles (manufactured by Nippon Aerosil Co., Ltd.; average primary particle diameter (manufacturer's nominal value): 100 nm) were sealed in a tube made of Teflon (trademark) together with 10,000 parts by mass of an aqueous solution of potassium hydroxide having a concentration of 17 mol/L. The tube was hermetically sealed in a pressure-resistant glass vessel and kept at 110° C. for 20 hours to perform hydrothermal treatment. The reaction product was neutralized with an aqueous solution of hydrochloric acid having a concentration of 1 mol/L, and then washing with ion-exchanged water and centrifugation were repeated to provide a white precipitate. Further, the resultant white precipitate was dried and then subjected to firing treatment at 650° C. for 30 minutes to provide rutile-type titanium oxide particles 1 having a primary particle diameter of 80 nm (long diameter side).

The rutile-type titanium oxide particles 1 were subjected to X-ray diffraction spectrum (CuKα) measurement using RINT2000 (manufactured by Rigaku Corporation) to find diffraction peaks at 27.4°, 36.1°, 41.2°, and 54.3° attributed to rutile-type titanium oxide.

The number-average particle diameters of the anatase-type titanium oxide particles 1 to 7 and the rutile-type titanium oxide particles 1 produced as described above are shown in Table 1.

TABLE 1

| Kind | Number-average particle diameter (nm) |
|---|---|
| Anatase-type titanium oxide particles 1 | 80 |
| Anatase-type titanium oxide particles 2 | 35 |
| Anatase-type titanium oxide particles 3 | 50 |
| Anatase-type titanium oxide particles 4 | 120 |
| Anatase-type titanium oxide particles 5 | 150 |
| Anatase-type titanium oxide particles 6 | 100 |

TABLE 1-continued

| Kind | Number-average particle diameter (nm) |
|---|---|
| Anatase-type titanium oxide particles 7 | 50 |
| Rutile-type titanium oxide particles 1 | 80 |

<Production of Electroconductive Particles>

(Production of Electroconductive Particles 1)

Niobium(V) hydroxide was dissolved in concentrated sulfuric acid, and the solution was mixed with an aqueous solution of titanium sulfate to prepare an acidic mixed liquid of a niobium salt and a titanium salt (hereinafter referred to as "titanium-niobium mixed liquid").

100 Parts of the anatase-type titanium oxide particles 1 were weighed and dispersed as particles before coating in water to give a suspension, and 1,000 parts of the aqueous suspension was heated to 670° C. while being stirred.

While the pH was maintained at 2.5, the titanium-niobium mixed liquid having a content of 337 g/kg in terms of Ti and a content of 10.3 g/kg in terms of Nb, and an aqueous solution of sodium hydroxide were simultaneously added with respect to the weight of the anatase-type titanium oxide particles 1.

In addition, a titanium-niobium acid solution (a weight ratio between a niobium atom and a titanium atom in the solution was 1.0/20.0) was prepared by mixing a niobium solution, which was obtained by dissolving 3 parts of niobium pentachloride ($NbCl_5$) in 100 parts of 11.4 mol/L hydrochloric acid, with 200 parts of a titanium sulfate solution having a content of 12.0 parts in terms of titanium. The titanium-niobium acid solution and a 10.7 mol/L aqueous solution of sodium hydroxide were simultaneously added dropwise (parallel addition) to the above-mentioned aqueous suspension over 3 hours so that the aqueous suspension had a pH of 2 to 3. After the completion of the dropwise addition, the suspension was filtered, washed, and dried at 110° C. for 8 hours. The dried product was fired together with organic matter in a nitrogen atmosphere at 725° C. (temperature at time of firing in Table 2) for 1 hour to provide niobium atom-containing titanium oxide particles 1 each having a niobium atom localized in the vicinity of its surface.

Next, the following materials were prepared.

| | |
|---|---|
| Niobium atom-containing titanium oxide particles 1: | 100.0 parts |
| Surface treatment agent 1 (compound represented by the following formula (S-1)) (product name: trimethoxypropylsilane, manufactured by Tokyo Chemical Industry Co.,Ltd.): 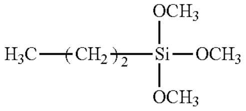 (S-1) | 6.0 parts |
| Toluene: | 200.0 parts |

Those materials were mixed and stirred with a stirring device for 4 hours, and then filtered and washed, followed further by heating treatment at 130° C. for 3 hours. Thus, electroconductive particles 1 were obtained.

(Production of Electroconductive Particles 2 to 9, 11 to 15, and 18)

In the production of the electroconductive particles 1, the kind of the particles before coating to be used and the weight ratio between the niobium atom and the titanium atom in the titanium-niobium acid solution at the time of coating were changed as shown in Table 1. Powders of electroconductive particles 2 to 9, 11 to 15, and 18 shown in Table 2 were obtained in the same manner as in the production of the electroconductive particles 1 except for the foregoing.

(Electroconductive Particles 10)

The kind and usage amount of the surface treatment agent were changed to 4 parts of a surface treatment agent 2 (compound represented by the following formula (S-2)) (product name: decyltrimethoxysilane, manufactured by Tokyo Chemical Industry Co., Ltd.). Electroconductive particles 10 were produced in the same manner as in the production of the electroconductive particles 1 except for the foregoing.

(S-2)

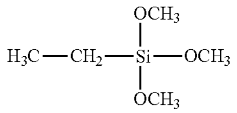

(Production Example of Electroconductive Particles 16)

The following materials were prepared.

| | |
|---|---|
| Tin oxide particles (product name: S-2000, manufactured by Mitsubishi Materials Corporation): | 100.0 parts |
| Surface treatment agent 1: | 20.0 parts |
| Toluene: | 200.0 parts |

Those materials were mixed and stirred with a stirring device for 4 hours, and then filtered and washed, followed further by heating treatment at 130° C. for 3 hours. Thus, surface treatment was performed to provide electroconductive particles 16.

(Production Example of Electroconductive Particles 17)

100 Parts of tin oxide particles (product name: S-2000, manufactured by Mitsubishi Materials Corporation) were dispersed in water to give 1,000 parts of an aqueous suspension, which was heated to 60° C.

In addition, a titanium-niobium acid solution (a weight ratio between a niobium atom and a titanium atom in the solution was 1.0/20.0) was prepared by mixing a niobium solution, which was obtained by dissolving 3 parts of niobium pentachloride ($NbCl_5$) in 100 parts of 11.4 mol/L hydrochloric acid, with 200 parts of a titanium sulfate solution having a content of 12.0 parts in terms of titanium. The titanium-niobium acid solution and a 10.7 mol/L solution of sodium hydroxide were simultaneously added dropwise (parallel addition) to the above-mentioned aqueous suspension over 3 hours so that the aqueous suspension had a pH of 2 to 3. After the completion of the dropwise addition, the suspension was filtered, washed, and dried at 110° C. for 8 hours. The dried product was fired together with organic matter in a nitrogen atmosphere at 725° C. (temperature at time of firing in Table 2) for 1 hour to provide niobium atom-containing tin oxide particles 1 each having a niobium atom localized in the vicinity of its surface as tin oxide-containing core particles before coating. Next, the following materials were prepared.

| | |
|---|---|
| Niobium-containing tin oxide particles 1: | 100.0 parts |
| Surface treatment agent 1: | 6.0 parts |
| Toluene: | 200.0 parts |

Those materials were mixed and stirred with a stirring device for 4 hours, and then filtered and washed, followed further by heating treatment at 130° C. for 3 hours. Thus, electroconductive particles 17 were obtained.

The surface physical properties and particle diameters (number-average particle diameters) of the electroconductive particles 1 to 18 obtained in the foregoing are shown in Table 2.

TABLE 2

| | | Particles before coating | | Niobium/titanium | | Temperature | | |
|---|---|---|---|---|---|---|---|---|
| | Particle diameter (nm) | Kind | Particle diameter (nm) | mass ratio in titanium-niobium acid solution | Coating material Kind | at time of firing [° C.] | Surface treatment agent | d(Nb)/ d(Ti) |
| Electroconductive particles 1 | 100 | Anatase-type titanium oxide particles 1 | 80 | 1.0/20.0 | Niobium atom-containing titanium oxide | 725 | Surface treatment agent 1 | 0.10 |
| Electroconductive particles 2 | 100 | Anatase-type titanium oxide particles 1 | 80 | 1.9/20.0 | Niobium atom-containing titanium oxide | 725 | Surface treatment agent 1 | 0.19 |
| Electroconductive particles 3 | 100 | Anatase-type titanium oxide particles 1 | 80 | 1.5/20.0 | Niobium atom-containing titanium oxide | 725 | Surface treatment agent 1 | 0.15 |
| Electroconductive particles 4 | 100 | Anatase-type titanium oxide particles 1 | 80 | 0.2/20.0 | Niobium atom-containing titanium oxide | 725 | Surface treatment agent 1 | 0.02 |
| Electroconductive particles 5 | 100 | Anatase-type titanium oxide particles 1 | 80 | 0.4/20.0 | Niobium atom-containing titanium oxide | 725 | Surface treatment agent 1 | 0.04 |
| Electroconductive particles 6 | 55 | Anatase-type titanium oxide particles 2 | 35 | 1.0/20.0 | Niobium atom-containing titanium oxide | 725 | Surface treatment agent 1 | 0.06 |
| Electroconductive particles 7 | 70 | Anatase-type titanium oxide particles 3 | 50 | 1.0/20.0 | Niobium atom-containing titanium oxide | 725 | Surface treatment agent 1 | 0.08 |
| Electroconductive particles 8 | 140 | Anatase-type titanium oxide particles 4 | 120 | 1.0/20.0 | Niobium atom-containing titanium oxide | 725 | Surface treatment agent 1 | 0.12 |
| Electroconductive particles 9 | 170 | Anatase-type titanium oxide particles 5 | 150 | 1.0/20.0 | Niobium atom-containing titanium oxide | 725 | Surface treatment agent 1 | 0.14 |
| Electroconductive particles 10 | 100 | Anatase-type titanium oxide particles 1 | 80 | 1.0/20.0 | Niobium atom-containing titanium oxide | 725 | Surface treatment agent 2 | 0.10 |
| Electroconductive particles 11 | 100 | Rutile-type titanium oxide particles 1 | 80 | 1.0/20.0 | Niobium atom-containing titanium oxide | 725 | Surface treatment agent 1 | 0.11 |
| Electroconductive particles 12 | 100 | Anatase-type titanium oxide particles 1 | 80 | 1.0/20.0 | Niobium atom-containing titanium oxide | 725 | — | 0.10 |
| Electroconductive particles 13 | 100 | Anatase-type titanium oxide particles 1 | 80 | 2.2/20.0 | Niobium atom-containing titanium oxide | 725 | Surface treatment agent 1 | 0.22 |
| Electroconductive particles 14 | 100 | Anatase-type titanium oxide particles 1 | 100 | — | — | — | Surface treatment agent 1 | 0 |
| Electroconductive particles 15 | 100 | Anatase-type titanium oxide particles 6 | 100 | — | — | — | Surface treatment agent 1 | 0.02 |
| Electroconductive particles 16 | 20 | Tin oxide particles | 20 | — | — | — | Surface treatment agent 1 | 0 |
| Electroconductive particles 17 | 30 | Tin oxide particles | 20 | 1.0/20.0 | Niobium atom-containing titanium oxide | 725 | Surface treatment agent 1 | 0.08 |
| Electroconductive particles 18 | 70 | Anatase-type titanium oxide particles 7 | 50 | 1.0/20.0 | Niobium atom-containing titanium oxide | 725 | Surface treatment agent 1 | 0.12 |

<Production of Electrophotographic Photosensitive Member>

(Production Example of Electrophotographic Photosensitive Member 1)

An aluminum cylinder having a diameter of 24 mm and a length of 257.5 mm (JIS-A3003, aluminum alloy) was used as a support (electroconductive support).

Next, the following materials were prepared.

| | |
|---|---|
| Titanium oxide ($TiO_2$) particles (average primary particle diameter: 230 nm) coated with oxygen-deficient tin oxide ($SnO_2$): | 214 parts |
| Phenol resin (product name: PLYOPHEN J-325, manufactured by DIC Corporation, resin solid content: 60 mass %): | 132 parts |
| 1-Methoxy-2-propanol: | 98 parts |

Those materials were placed in a sand mill using 450 parts of glass beads each having a diameter of 0.8 mm, and were subjected to dispersion treatment under the conditions of a rotation speed of 2,000 rpm, a dispersion treatment time of 4.5 hours, and a preset temperature of cooling water of 18° C. to provide a dispersion liquid. The glass beads were removed from the dispersion liquid with a mesh (aperture: 150 μm). To the resultant dispersion liquid, silicone resin particles (product name: TOSPEARL 120, manufactured by Momentive Performance Materials, average particle diameter: 2 μm) serving as a surface roughness-imparting material were added. The addition amount of the silicone resin particles was set to 10 mass % with respect to the total mass of the metal oxide particles and the binding material in the dispersion liquid after the removal of the glass beads. In addition, a silicone oil (product name: SH28PA, manufactured by Dow Toray Co., Ltd.) serving as a leveling agent was added to the dispersion liquid at 0.01 mass % with respect to the total mass of the metal oxide particles and the binding material in the dispersion liquid.

Next, a mixed solvent of methanol and 1-methoxy-2-propanol (mass ratio: 1:1) was added to the dispersion liquid so that the total mass of the metal oxide particles, the binding material, and the surface roughness-imparting material (i.e., the mass of the solid content) in the dispersion liquid became 67 mass % with respect to the mass of the dispersion liquid. After that, the mixture was stirred to prepare a coating liquid for an electroconductive layer. The coating liquid for an electroconductive layer was applied onto the support by dip coating, and the resultant was heated at 140° C. for 1 hour to form an electroconductive layer having a thickness of 30 μm.

Next, the following materials were prepared.

| | |
|---|---|
| Electron-transporting substance (compound represented by the following formula (E-1)): | 3.0 parts |
| Blocked isocyanate (product name: DURANATE SBB-70P, manufactured by Asahi Kasei Chemicals Corporation): | 6.5 parts |
| Styrene-acrylic resin (product name: UC-3920, manufactured by Toagosei Co., Ltd.): | 0.4 part |
| Silica slurry (product name: IPA-ST-UP, manufactured by Nissan Chemical Industries, Ltd., solid content concentration: 15 mass %, viscosity: 9 mPa · s): | 1.8 parts |
| 1-Butanol: | 48 parts |
| Acetone: | 24 parts |

Those materials were mixed and dissolved to prepare a coating liquid for an undercoat layer. The coating liquid for an undercoat layer was applied onto the electroconductive layer by dip coating, and the resultant was heated at 170° C. for 30 minutes to form an undercoat layer having a thickness of 0.7 μm.

(E-1)

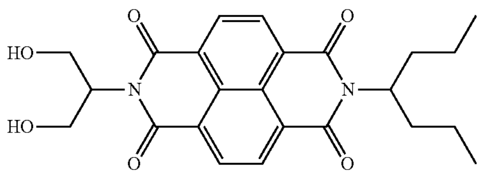

Next, the following materials were prepared.

| | |
|---|---|
| Hydroxygallium phthalocyanine of a crystal form having peaks at positions of 7.5° and 28.4° in a chart obtained by CuKα characteristic X-ray diffraction | 10 parts |
| Polyvinyl butyral resin (product name: S-LEC BX-1, manufactured by Sekisui Chemical Co., Ltd.) | 5 parts |

Those materials were added to 200 parts of cyclohexanone, and the mixture was dispersed with a sand mill apparatus using glass beads each having a diameter of 0.9 mm for 6 hours.

The resultant was diluted by further adding 150 parts of cyclohexanone and 350 parts of ethyl acetate thereto to provide a coating liquid for a charge-generating layer. The resultant coating liquid was applied onto the undercoat layer by dip coating, followed by drying at 95° C. for 10 minutes to form a charge-generating layer having a thickness of 0.20 μm.

Next, the following materials were prepared.

| | |
|---|---|
| Charge-transporting substance (hole-transportable substance) represented by the following structural formula (C-1): | 6.0 parts |
| Charge-transporting substance (hole-transportable substance) represented by the following structural formula (C-2): | 3.0 parts |
| Charge-transporting substance (hole-transportable substance) represented by the following structural formula (C-3): | 1.0 part |
| Polycarbonate resin (product name: Iupilon Z400, manufactured by Mitsubishi Engineering-Plastics Corporation): | 10.0 parts |
| Polycarbonate resin having a copolymerization unit having a structure represented by the following structural formula (C-4) and a structure represented by the following structural formula (C-5) (x/y = 0.95/0.05: viscosity-average molecular weight = 20,000): | 0.02 part |

Those materials were dissolved in a mixed solvent of 25 parts of o-xylene/25 parts of methyl benzoate/25 parts of dimethoxymethane to prepare a coating liquid for a charge-transporting layer. The coating liquid for a charge-transporting layer was applied onto the charge-generating layer by dip coating to form a coat, and the coat was dried at 120° C. for 30 minutes to form a charge-transporting layer having a thickness of 12 μm.

(C-1)

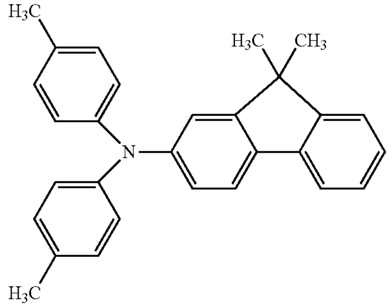

(C-2)

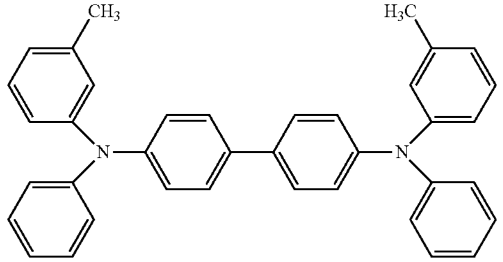

(C-3)

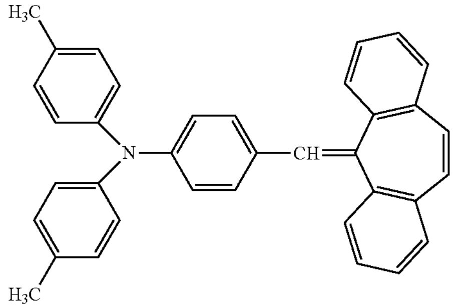

(C-4)

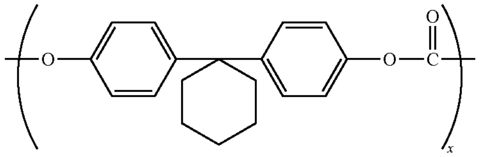

(C-5)

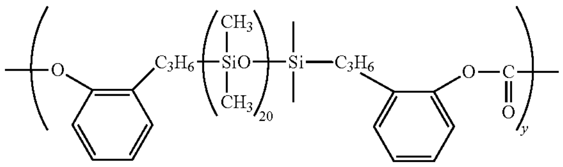

Next, the following materials were prepared.

| | |
|---|---|
| Electroconductive particles 1: | 76.0 parts |
| Compound represented by the following structural formula (O-1) serving as a binder resin: | 79.0 parts |
| 1-Propanol (1-PA): | 100.0 parts |
| Cyclohexane (CH): | 100.0 parts |

Those materials were mixed and stirred with a stirring device for 6 hours to prepare a coating liquid 1 for a protection layer.

(O-1)

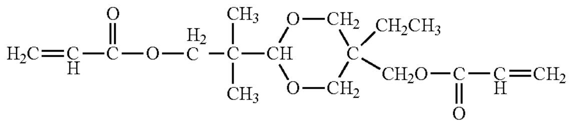

The coating liquid 1 for a protection layer was applied onto the charge-transporting layer by dip coating to form a coat, and the resultant coat was dried at 50° C. for 6 minutes. After that, under a nitrogen atmosphere, the coat was irradiated with an electron beam for 1.6 seconds under the conditions of an acceleration voltage of 70 kV and a beam current of 5.0 mA while the support (body to be irradiated) was rotated at a speed of 300 rpm. A dose at the position of the protection layer was 15 kGy. After that, under a nitrogen atmosphere, the temperature of the coat was increased to 117° C. An oxygen concentration during a period from the electron beam irradiation to the subsequent heating treatment was 10 ppm.

Next, in the air, the coat was naturally cooled until its temperature became 25° C., and then heating treatment was performed for 1 hour under such a condition that the temperature of the coat became 120° C., to thereby form a protection layer having a thickness of 2 Thus, an electrophotographic photosensitive member 1 including a protection layer containing the electroconductive particles 1 was produced. The physical properties of the electrophotographic photosensitive member 1 are shown in Table 4.

(Production Examples of Electrophotographic Photosensitive Members 2 to 25 and 27 to 38)

Coating liquids 2 to 25 and 27 to 38 for protection layers were prepared in the same manner as in the production example of the electrophotographic photosensitive member 1 except that the kind and usage amount of the electroconductive particles to be used for the preparation of the coating liquid for a protection layer were changed as shown in Table 3. Electrophotographic photosensitive members 2 to 25 and 27 to 38 were produced in the same manner as the electrophotographic photosensitive member 1 except that the resultant coating liquids 2 to 25 and 27 to 38 for protection layers were used in place of the coating liquid 1 for a protection layer.

A silicone resin used for the preparation of coating liquids for protection layers is a silicone resin having a weight-average molecular weight of about 4,000 (SR-213 (manufactured by Dow Corning Toray Co., Ltd.)). The physical properties of the electrophotographic photosensitive members 2 to 25 and 27 to 38 are shown in Table 4.

(Production Example of Electrophotographic Photosensitive Member 26)

A coating liquid 26 for a protection layer was prepared in the same manner as in the production example of the electrophotographic photosensitive member 1 except that the kind and usage amount of each of the binder resin and the mixed solvent to be used for the preparation of the coating liquid for a protection layer were changed as described below.

Binder resin: 1 part of a polyester resin containing a structural unit represented by the following formula (0-2) and a structural unit represented by the following formula (0-3) at a ratio of 5/5, and having a weight-average molecular weight (Mw) of 100,000

Mixed solvent: 12 parts of chlorobenzene/8 parts of dimethoxymethane

The resultant coating liquid 26 for a protection layer was applied onto the charge-transporting layer by dip coating to form a coat, and the coat was dried at 120° C. for 30 minutes to form a protection layer having a thickness of 2 μm. An electrophotographic photosensitive member 26 was produced in the same manner as the electrophotographic photosensitive member 1 except for the foregoing. The physical properties of the electrophotographic photosensitive member 26 are shown in Table 4.

(O-2)

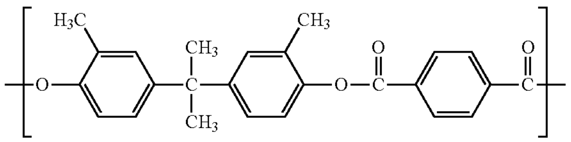

(O-3)

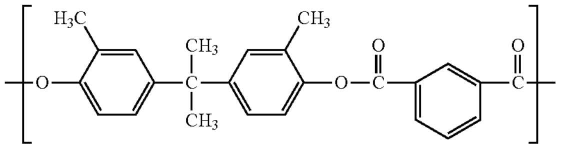

TABLE 3

| | Coating liquid for protection layer | Electroconductive particles | | Binder resin | | Silicone resin | Solvent | |
|---|---|---|---|---|---|---|---|---|
| | | Kind | Addition amount | Kind | Addition amount | Addition amount | Kind | Addition amount |
| Electrophotographic photosensitive member 1 | Coating liquid 1 for protection layer | Electroconductive particles 1 | 76.0 | Binder resin 1 | 79.0 | 0.0 | 1-Propanol/cyclohexane | 200.0 |
| Electrophotographic photosensitive member 2 | Coating liquid 2 for protection layer | Electroconductive particles 2 | 76.0 | Binder resin 1 | 79.0 | 0.0 | 1-Propanol/cyclohexane | 200.0 |
| Electrophotographic photosensitive member 3 | Coating liquid 3 for protection layer | Electroconductive particles 2 | 26.6 | Binder resin 1 | 79.0 | 0.0 | 1-Propanol/cyclohexane | 200.0 |
| Electrophotographic photosensitive member 4 | Coating liquid 4 for protection layer | Electroconductive particles 2 | 144.4 | Binder resin 1 | 79.0 | 0.0 | 1-Propanol/cyclohexane | 200.0 |
| Electrophotographic photosensitive member 5 | Coating liquid 5 for protection layer | Electroconductive particles 3 | 76.0 | Binder resin 1 | 79.0 | 0.0 | 1-Propanol/cyclohexane | 200.0 |
| Electrophotographic photosensitive member 6 | Coating liquid 6 for protection layer | Electroconductive particles 3 | 133.0 | Binder resin 1 | 79.0 | 0.0 | 1-Propanol/cyclohexane | 200.0 |
| Electrophotographic photosensitive member 7 | Coating liquid 7 for protection layer | Electroconductive particles 4 | 76.0 | Binder resin 1 | 79.0 | 0.0 | 1-Propanol/cyclohexane | 200.0 |
| Electrophotographic photosensitive member 8 | Coating liquid 8 for protection layer | Electroconductive particles 4 | 26.6 | Binder resin 1 | 79.0 | 0.0 | 1-Propanol/cyclohexane | 200.0 |
| Electrophotographic photosensitive member 9 | Coating liquid 9 for protection layer | Electroconductive particles 4 | 144.4 | Binder resin 1 | 79.0 | 0.0 | 1-Propanol/cyclohexane | 200.0 |
| Electrophotographic photosensitive member 10 | Coating liquid 10 for protection layer | Electroconductive particles 5 | 76.0 | Binder resin 1 | 79.0 | 0.0 | 1-Propanol/cyclohexane | 200.0 |
| Electrophotographic photosensitive member 11 | Coating liquid 11 for protection layer | Electroconductive particles 5 | 26.6 | Binder resin 1 | 79.0 | 0.0 | 1-Propanol/cyclohexane | 200.0 |
| Electrophotographic photosensitive member 12 | Coating liquid 12 for protection layer | Electroconductive particles 5 | 144.4 | Binder resin 1 | 79.0 | 0.0 | 1-Propanol/cyclohexane | 200.0 |
| Electrophotographic photosensitive member 13 | Coating liquid 13 for protection layer | Electroconductive particles 6 | 76.0 | Binder resin 1 | 79.0 | 0.0 | 1-Propanol/cyclohexane | 200.0 |
| Electrophotographic photosensitive member 14 | Coating liquid 14 for protection layer | Electroconductive particles 7 | 76.0 | Binder resin 1 | 79.0 | 0.0 | 1-Propanol/cyclohexane | 200.0 |

TABLE 3-continued

| | Coating liquid for protection layer | | | | | | | | |
|---|---|---|---|---|---|---|---|---|---|
| | | Electroconductive particles | | Binder resin | | Silicone resin | Solvent | |
| | | Kind | Addition amount | Kind | Addition amount | Addition amount | Kind | Addition amount |
| Electrophotographic photosensitive member 15 | Coating liquid 15 for protection layer | Electroconductive particles 8 | 76.0 | Binder resin 1 | 79.0 | 0.0 | 1-Propanol/ cyclohexane | 200.0 |
| Electrophotographic photosensitive member 16 | Coating liquid 16 for protection layer | Electroconductive particles 9 | 76.0 | Binder resin 1 | 79.0 | 0.0 | 1-Propanol/ cyclohexane | 200.0 |
| Electrophotographic photosensitive member 17 | Coating liquid 17 for protection layer | Electroconductive particles 1 | 144.4 | Binder resin 1 | 61.0 | 0.0 | 1-Propanol/ cyclohexane | 200.0 |
| Electrophotographic photosensitive member 18 | Coating liquid 18 for protection layer | Electroconductive particles 1 | 114.0 | Binder resin 1 | 69.0 | 0.0 | 1-Propanol/ cyclohexane | 200.0 |
| Electrophotographic photosensitive member 19 | Coating liquid 19 for protection layer | Electroconductive particles 1 | 45.6 | Binder resin 1 | 87.0 | 0.0 | 1-Propanol/ cyclohexane | 200.0 |
| Electrophotographic photosensitive member 20 | Coating liquid 20 for protection layer | Electroconductive particles 1 | 26.6 | Binder resin 1 | 92.0 | 0.0 | 1-Propanol/ cyclohexane | 200.0 |
| Electrophotographic photosensitive member 21 | Coating liquid 21 for protection layer | Electroconductive particles 10 | 76.0 | Binder resin 1 | 79.0 | 0.0 | 1-Propanol/ cyclohexane | 200.0 |
| Electrophotographic photosensitive member 22 | Coating liquid 22 for protection layer | Electroconductive particles 18 | 76.0 | Binder resin 1 | 79.0 | 0.0 | 1-Propanol/ cyclohexane | 200.0 |
| Electrophotographic photosensitive member 23 | Coating liquid 23 for protection layer | Electroconductive particles 1 | 76.0 | Binder resin 1 | 79.0 | 1.0 | 1-Propanol/ cyclohexane | 200.0 |
| Electrophotographic photosensitive member 24 | Coating liquid 24 for protection layer | Electroconductive particles 1 | 76.0 | Binder resin 1 | 78.0 | 2.0 | 1-Propanol/ cyclohexane | 200.0 |
| Electrophotographic photosensitive member 25 | Coating liquid 25 for protection layer | Electroconductive particles 1 | 76.0 | Binder resin 1 | 77.0 | 3.0 | 1-Propanol/ cyclohexane | 200.0 |
| Electrophotographic photosensitive member 26 | Coating liquid 26 for protection layer | Electroconductive particles 1 | 76.0 | Binder resin 2 | 79.0 | 0.0 | 1-Propanol/ cyclohexane | 200.0 |
| Electrophotographic photosensitive member 27 | Coating liquid 27 for protection layer | Electroconductive particles 11 | 76.0 | Binder resin 1 | 79.0 | 0.0 | 1-Propanol/ cyclohexane | 200.0 |
| Electrophotographic photosensitive member 28 | Coating liquid 28 for protection layer | Electroconductive particles 17 | 152.0 | Binder resin 1 | 79.0 | 0.0 | 1-Propanol/ cyclohexane | 200.0 |
| Electrophotographic photosensitive member 29 | Coating liquid 29 for protection layer | Electroconductive particles 12 | 76.0 | Binder resin 1 | 79.0 | 0.0 | 1-Propanol/ cyclohexane | 200.0 |
| Electrophotographic photosensitive member 30 | Coating liquid 30 for protection layer | Electroconductive particles 13 | 76.0 | Binder resin 1 | 79.0 | 0.0 | 1-Propanol/ cyclohexane | 200.0 |
| Electrophotographic photosensitive member 31 | Coating liquid 31 for protection layer | Electroconductive particles 14 | 40.0 | Binder resin 1 | 79.0 | 0.0 | 1-Propanol/ cyclohexane | 200.0 |
| Electrophotographic photosensitive member 32 | Coating liquid 32 for protection layer | Electroconductive particles 9 | 148.2 | Binder resin 1 | 60.0 | 0.0 | 1-Propanol/ cyclohexane | 200.0 |
| Electrophotographic photosensitive member 33 | Coating liquid 33 for protection layer | Electroconductive particles 9 | 269.8 | Binder resin 1 | 28.0 | 0.0 | 1-Propanol/ cyclohexane | 200.0 |
| Electrophotographic photosensitive member 34 | Coating liquid 34 for protection layer | Electroconductive particles 15 | 76.0 | Binder resin 1 | 79.0 | 0.0 | 1-Propanol/ cyclohexane | 200.0 |
| Electrophotographic photosensitive member 35 | Coating liquid 35 for protection layer | — | 0.0 | Binder resin 1 | 99.0 | 0.0 | 1-Propanol/ cyclohexane | 200.0 |
| Electrophotographic photosensitive member 36 | Coating liquid 36 for protection layer | Electroconductive particles 1 | 76.0 | Binder resin 1 | 79.0 | 5.0 | 1-Propanol/ cyclohexane | 200.0 |
| Electrophotographic photosensitive member 37 | Coating liquid 37 for protection layer | Electroconductive particles 1 | 11.4 | Binder resin 1 | 92.0 | 0.0 | 1-Propanol/ cyclohexane | 200.0 |

TABLE 3-continued

| | Coating liquid for protection layer | Electroconductive particles | | Binder resin | | Silicone resin | Solvent | |
|---|---|---|---|---|---|---|---|---|
| | | Kind | Addition amount | Kind | Addition amount | Addition amount | Kind | Addition amount |
| Electrophotographic photosensitive member 38 | Coating liquid 38 for protection layer | Electroconductive particles 16 | 20.0 | Binder resin 1 | 79.0 | 0.0 | 1-Propanol/ cyclohexane | 200.0 |

TABLE 4

| | Atomic concentration ratio of niobium atom to titanium atom in metal oxide d(Nb)/d(Ti) | d(Ti) | d(Si) | d(Ti)/ d(Si) | Content ratio of particles [vol %] | Powder X-ray diffraction analysis | C/D | Volume resistivity A [Ω · cm] 23° C. 50% RH | Volume resistivity B [Ω · cm] 32.5° C. 80% RH | log(A/B) | Charge retentivity |
|---|---|---|---|---|---|---|---|---|---|---|---|
| Electrophotographic photosensitive member 1 | 0.10 | 1.0 | 2.5 | 0.40 | 20 | A | 5.2 | $1.0 \times 10^{13}$ | $3.2 \times 10^{11}$ | 1.5 | 9.2 |
| Electrophotographic photosensitive member 2 | 0.19 | 1.1 | 2.5 | 0.44 | 20 | A | 9.9 | $5.0 \times 10^{13}$ | $6.3 \times 10^{11}$ | 1.9 | 9.4 |
| Electrophotographic photosensitive member 3 | 0.19 | 0.2 | 1.0 | 0.20 | 7 | A | 9.9 | $6.0 \times 10^{13}$ | $7.6 \times 10^{11}$ | 1.9 | 9.4 |
| Electrophotographic photosensitive member 4 | 0.19 | 1.8 | 2.2 | 0.82 | 38 | A | 9.9 | $4.0 \times 10^{13}$ | $5.0 \times 10^{11}$ | 1.9 | 9.4 |
| Electrophotographic photosensitive member 5 | 0.15 | 0.9 | 2.5 | 0.36 | 20 | A | 7.8 | $2.5 \times 10^{13}$ | $1.0 \times 10^{12}$ | 1.4 | 9.3 |
| Electrophotographic photosensitive member 6 | 0.15 | 1.5 | 2.0 | 0.75 | 35 | A | 7.8 | $2.3 \times 10^{13}$ | $9.2 \times 10^{11}$ | 1.4 | 9.3 |
| Electrophotographic photosensitive member 7 | 0.02 | 1.2 | 2.4 | 0.50 | 20 | A | 1.0 | $1.1 \times 10^{13}$ | $8.7 \times 10^{11}$ | 1.1 | 9.2 |
| Electrophotographic photosensitive member 8 | 0.02 | 0.2 | 1.0 | 0.20 | 7 | A | 1.0 | $1.3 \times 10^{13}$ | $1.0 \times 10^{12}$ | 1.1 | 9.2 |
| Electrophotographic photosensitive member 9 | 0.02 | 1.8 | 2.2 | 0.82 | 38 | A | 1.0 | $9.0 \times 10^{12}$ | $7.1 \times 10^{11}$ | 1.1 | 9.2 |
| Electrophotographic photosensitive member 10 | 0.04 | 1.3 | 2.5 | 0.52 | 20 | A | 2.1 | $2.0 \times 10^{13}$ | $1.0 \times 10^{12}$ | 1.3 | 9.3 |
| Electrophotographic photosensitive member 11 | 0.04 | 0.2 | 1.0 | 0.20 | 7 | A | 2.1 | $8.0 \times 10^{13}$ | $4.0 \times 10^{12}$ | 1.3 | 9.5 |
| Electrophotographic photosensitive member 12 | 0.04 | 1.8 | 2.2 | 0.82 | 38 | A | 2.1 | $2.0 \times 10^{13}$ | $1.0 \times 10^{12}$ | 1.3 | 9.3 |
| Electrophotographic photosensitive member 13 | 0.06 | 0.7 | 2.5 | 0.28 | 20 | A | 3.1 | $1.0 \times 10^{13}$ | $7.9 \times 10^{11}$ | 1.1 | 9.2 |
| Electrophotographic photosensitive member 14 | 0.08 | 1.0 | 2.5 | 0.40 | 20 | A | 4.2 | $2.5 \times 10^{13}$ | $1.3 \times 10^{12}$ | 1.3 | 9.3 |
| Electrophotographic photosensitive member 15 | 0.12 | 1.0 | 2.5 | 0.40 | 20 | A | 6.2 | $2.5 \times 10^{13}$ | $5.0 \times 10^{11}$ | 1.7 | 9.3 |
| Electrophotographic photosensitive member 16 | 0.14 | 1.0 | 2.0 | 0.50 | 20 | A | 7.3 | $2.5 \times 10^{13}$ | $3.1 \times 10^{11}$ | 1.9 | 9.3 |
| Electrophotographic photosensitive member 17 | 0.10 | 2.8 | 3.2 | 0.88 | 38 | A | 5.2 | $3.0 \times 10^{12}$ | $1.9 \times 10^{10}$ | 2.2 | 9.0 |
| Electrophotographic photosensitive member 18 | 0.10 | 2.0 | 2.8 | 0.71 | 30 | A | 5.2 | $5.0 \times 10^{12}$ | $1.3 \times 10^{11}$ | 1.6 | 9.1 |

TABLE 4-continued

| | Atomic concentration ratio of niobium atom to titanium atom in metal oxide d(Nb)/d(Ti) | d(Ti) | d(Si) | d(Ti)/ d(Si) | Content ratio of particles [vol %] | Powder X-ray diffraction analysis | C/D | Volume resistivity A [Ω · cm] 23° C. 50% RH | Volume resistivity B [Ω · cm] 32.5° C. 80% RH | log(A/B) | Charge retentivity |
|---|---|---|---|---|---|---|---|---|---|---|---|
| Electrophotographic photosensitive member 19 | 0.10 | 0.4 | 1.0 | 0.40 | 12 | A | 5.2 | $3.0 \times 10^{13}$ | $3.8 \times 10^{12}$ | 0.9 | 9.3 |
| Electrophotographic photosensitive member 20 | 0.10 | 0.1 | 0.7 | 0.14 | 7 | A | 5.2 | $3.5 \times 10^{13}$ | $7.0 \times 10^{12}$ | 0.7 | 9.4 |
| Electrophotographic photosensitive member 21 | 0.10 | 0.7 | 2.0 | 0.35 | 20 | A | 5.2 | $3.0 \times 10^{13}$ | $1.2 \times 10^{12}$ | 1.4 | 9.3 |
| Electrophotographic photosensitive member 22 | 0.12 | 0.7 | 2.5 | 0.28 | 20 | A | 6.2 | $1.1 \times 10^{13}$ | $5.5 \times 10^{11}$ | 1.3 | 9.2 |
| Electrophotographic photosensitive member 23 | 0.10 | 0.5 | 4.0 | 0.13 | 20 | A | 5.2 | $2.5 \times 10^{13}$ | $5.0 \times 10^{11}$ | 1.7 | 9.3 |
| Electrophotographic photosensitive member 24 | 0.10 | 0.3 | 6.0 | 0.05 | 20 | A | 5.2 | $2.6 \times 10^{13}$ | $1.6 \times 10^{12}$ | 1.2 | 9.3 |
| Electrophotographic photosensitive member 25 | 0.10 | 0.2 | 7.8 | 0.03 | 20 | A | 5.2 | $2.4 \times 10^{13}$ | $4.8 \times 10^{12}$ | 0.7 | 9.3 |
| Electrophotographic photosensitive member 26 | 0.10 | 1.1 | 1.3 | 0.85 | 20 | A | 5.2 | $1.0 \times 10^{13}$ | $4.0 \times 10^{11}$ | 1.4 | 9.2 |
| Electrophotographic photosensitive member 27 | 0.11 | 1.2 | 1.3 | 0.92 | 20 | R | 5.7 | $2.0 \times 10^{12}$ | $6.3 \times 10^{9}$ | 2.5 | 9.0 |
| Electrophotographic photosensitive member 28 | 0.08 | 0.6 | 1.3 | 0.46 | 20 | A/S | — | $1.5 \times 10^{13}$ | $6.0 \times 10^{11}$ | 1.4 | 9.3 |
| Electrophotographic photosensitive member 29 | 0.10 | 1.0 | 1.3 | — | 20 | A | 5.2 | $1.5 \times 10^{13}$ | $6.0 \times 10^{11}$ | 1.4 | 9.3 |
| Electrophotographic photosensitive member 30 | 0.22 | 1.0 | 1.0 | 1.00 | 20 | A | 11.4 | $2.5 \times 10^{13}$ | $1.0 \times 10^{12}$ | 1.4 | 9.3 |
| Electrophotographic photosensitive member 31 | 0 | 1.0 | 1.3 | 0.77 | 20 | A | — | $2.5 \times 10^{11}$ | $1.0 \times 10^{8}$ | 3.4 | 8.7 |
| Electrophotographic photosensitive member 32 | 0.10 | 2.2 | 1.5 | 1.47 | 39 | A | 5.2 | $8.9 \times 10^{12}$ | $1.0 \times 10^{11}$ | 1.9 | 9.2 |
| Electrophotographic photosensitive member 33 | 0.10 | 3.6 | 3.0 | — | 71 | A | 5.2 | $1.1 \times 10^{11}$ | $3.5 \times 10^{8}$ | 2.5 | 8.6 |
| Electrophotographic photosensitive member 34 | 0.02 | 2.3 | — | — | 20 | A | 1.0 | $2.5 \times 10^{13}$ | $7.9 \times 10^{10}$ | 2.5 | 9.3 |
| Electrophotographic photosensitive member 35 | 0 | — | — | — | 0 | — | — | $1.0 \times 10^{14}$ | $1.0 \times 10^{11}$ | 3.0 | 9.5 |
| Electrophotographic photosensitive member 36 | 0.10 | 0.1 | 10.0 | 0.01 | 20 | A | 5.2 | $2.5 \times 10^{13}$ | $1.0 \times 10^{12}$ | 1.4 | 9.3 |
| Electrophotographic photosensitive member 37 | 0.10 | 0.1 | 1.0 | 0.10 | 3 | A | 5.2 | $2.5 \times 10^{13}$ | $1.0 \times 10^{12}$ | 1.4 | 9.3 |
| Electrophotographic photosensitive member 38 | 0 | 0.1 | 1.0 | 0.10 | 20 | S | — | $2.5 \times 10^{9}$ | $1.0 \times 10^{7}$ | 2.4 | 8.1 |

In the tables, C represents the "concentration ratio between the niobium atom and the titanium atom at the inside portion at 5% of the maximum diameter of the measurement particle from the surface of the particle," and D represents the "concentration ratio between the niobium atom and the titanium atom at the central portion of the particle." In the "Powder X-ray diffraction analysis" column, A, R, and S indicate that it was recognized that anatase-type titanium oxide, rutile-type titanium oxide, and tin oxide were contained, respectively.

<Evaluation of Electrophotographic Photosensitive Member>

(Evaluation of Injection Chargeability)

A reconstructed machine of a laser beam printer (electrophotographic apparatus) (product name: HP LaserJet Enterprise ColorM553dn, manufactured by Hewlett-Packard Company) was used for the measurement of injection chargeability. The reconstructed machine used for evaluation was reconstructed so that an image exposure amount, the amount of a current flowing from a charging roller to the support of an electrophotographic photosensitive member (hereinafter sometimes referred to as "total current"), and a voltage applied to the charging roller were each allowed to be regulated and measured.

In addition, the process cartridge for a cyan color of the above-mentioned reconstructed machine was reconstructed to mount a potential probe (model 6000B-8: manufactured by Trek Japan) at the development position thereof. Next, with regard to a potential at the central portion of the electrophotographic photosensitive member, a surface potentiometer (model 344: manufactured by Trek Japan) was used and adapted to be capable of measuring the surface potential.

Under an environment having a temperature of 32.5° C. and a humidity of 80% RH, the reconstructed machine was mounted with the electrophotographic photosensitive member, a DC current of 1,000 V was applied to the charging roller, and the photosensitive member was charged while being rotated at 60 rpm. The potential of the surface of the photosensitive member at this time was represented by A, and the injection chargeability was evaluated in terms of injection chargeability=A/1,000 by the following evaluation criteria. The evaluation results are shown in Table 5.

A: The injection chargeability is 0.90 or more.

B: The injection chargeability is 0.85 or more and less than 0.90.

C: The injection chargeability is 0.75 or more and less than 0.85.

D: The injection chargeability is less than 0.75.

(Image Smearing Evaluation)

First, the above-mentioned reconstructed machine and an electrophotographic photosensitive member were left to stand under each of a normal-humidity environment having a temperature of 23.0° C. and a humidity of 50% RH and a high-humidity environment having a temperature of 32.5° C. and a humidity of 80% RH for 24 hours or more. After that, the electrophotographic photosensitive member that had been left to stand under each environment was mounted onto the cyan color cartridge of the reconstructed machine.

Next, an applied voltage was applied while being gradually increased from −400 V in increments of 100 V to −2,000 V, and the total current at each applied voltage was measured. Then, a graph having a horizontal axis representing the applied voltage and a vertical axis representing the total current was prepared, and an applied voltage at which a current value deviating from a first approximation curve at applied voltages of −400 to −800 V became 100 μA was determined. The applied voltage was set to the determined value.

Next, with use of plain paper (product name: CS-680 (68 $g/m^2$), manufactured by Canon Marketing Japan Inc.) as paper, a solid image was output with a single cyan color. An image exposure light amount was set so that the solid image had a density on the paper of 1.45 as measured with a spectral densitometer (product name: X-Rite 504, manufactured by X-Rite, Inc.). Next, a square lattice image having an A4 size, a line width of 0.1 mm, and a line interval of 10 mm was continuously output with a single cyan color on 10 sheets. For the resultant image, image smearing was evaluated by the following evaluation criteria. The evaluation results are shown in Table 5.

A: No abnormality is found on the lattice image.

B: The horizontal lines of the lattice image are broken, but no abnormality is found in the vertical lines.

C: The horizontal lines of the lattice image have disappeared, and the vertical lines are broken.

D: The horizontal lines of the lattice image have disappeared, and the vertical lines have also disappeared.

In this case, the "horizontal lines" in the lattice image refer to lines parallel to the cylindrical axis direction of the electrophotographic photosensitive member, and the "vertical lines" refer to lines perpendicular to the cylindrical axis direction of the photosensitive member.

Next, the following test was performed using an electrophotographic photosensitive member that had been left to stand under a high-humidity environment having a temperature of 32.5° C. and a humidity of 80% RH for 24 hours or more. First, with use of plain paper (product name: CS-680 (68 $g/m^2$), Canon Marketing Japan Inc.) as paper, a square lattice image having a line width of 0.1 mm and a line interval of 10 mm was continuously output with a single cyan color on 20,000 sheets in a two-sheet intermittent manner at an intermittent time of 2 seconds. After the image output, the electrophotographic apparatus was left to stand with its main power source turned off under a high-humidity environment having a temperature of 32.5° C. and a humidity of 80% RH for 3 days. After the standing, the main power source of the electrophotographic apparatus was turned on, and immediately after that, the above-mentioned square lattice image was similarly output on 1 sheet. Image smearing of the output image was visually observed, and the image smearing was evaluated by the following evaluation criteria. The evaluation results are shown in Table 5.

A: No abnormality is found on the lattice image.

B: The horizontal lines of the lattice image are broken, but no abnormality is found in the vertical lines.

C: The horizontal lines of the lattice image have disappeared, and the vertical lines are broken.

D: The horizontal lines of the lattice image have disappeared, and the vertical lines have also disappeared.

In this case, the "horizontal lines" in the lattice image refer to lines parallel to the cylindrical axis direction of the photosensitive member, and the "vertical lines" refer to lines perpendicular to the cylindrical axis direction of the photosensitive member.

(Evaluation of Charging Uniformity)

The above-mentioned reconstructed machine was placed under a high-humidity environment at 32.5° C. and 80% RH, and a letter image having a print percentage of 1% was output on 10,000 sheets, followed by the formation of a halftone (20H) image. The charging uniformity of the electrophotographic photosensitive member was evaluated by evaluating the coarseness (density uniformity) of the resultant image. Paper used was plain paper (product name: CS-680 (68 $g/m^2$), Canon Marketing Japan Inc.). The "20H image" is a halftone image when, in terms of value obtained by representing 256 gradations in hexadecimal notation, OOH represents solid white (non-image) and FFH represents solid black (entire surface image).

The coarseness of the image was evaluated by the following criteria. Density measurement was performed at randomly selected 20 sites, and the value of a density difference between the maximum value and the minimum value was adopted as the density uniformity and evaluated by the following criteria. The density was measured with an X-Rite color reflection densitometer (product name: X-Rite 500 Series, manufactured by X-Rite, Inc.). The evaluation results are shown in Table 5.

A: The density uniformity is less than 0.04.
B: The density uniformity is 0.04 or more and less than 0.06.
C: The density uniformity is 0.06 or more and less than 0.08.
D: The density uniformity is 0.08 or more.

TABLE 5

| | Injection chargeability | | Image smearing | | | Halftone coarseness | |
|---|---|---|---|---|---|---|---|
| | | | Initial under | Initial under | Long period | | |
| | Evaluation | Numerical value | 23° C. and 50% RH | 32.5° C. and 80% RH | under 32.5° C. and 80% RH | Evaluation | Density difference |
| Example 1 | A | 0.91 | A | A | A | A | 0.03 |
| Example 2 | B | 0.88 | A | B | B | B | 0.05 |
| Example 3 | B | 0.89 | A | A | B | B | 0.05 |
| Example 4 | B | 0.89 | B | B | A | B | 0.05 |
| Example 5 | B | 0.89 | A | A | A | B | 0.05 |
| Example 6 | B | 0.89 | B | A | A | B | 0.05 |
| Example 7 | A | 0.91 | B | C | C | A | 0.03 |
| Example 8 | A | 0.92 | B | B | C | A | 0.03 |
| Example 9 | A | 0.92 | C | C | B | A | 0.03 |
| Example 10 | B | 0.89 | B | C | C | B | 0.05 |
| Example 11 | B | 0.88 | B | B | C | B | 0.05 |
| Example 12 | B | 0.89 | C | C | B | B | 0.05 |
| Example 13 | A | 0.91 | A | B | C | A | 0.03 |
| Example 14 | B | 0.89 | A | B | A | B | 0.05 |
| Example 15 | B | 0.89 | B | C | B | B | 0.05 |
| Example 16 | B | 0.89 | C | C | C | B | 0.05 |
| Example 17 | A | 0.93 | C | C | C | B | 0.05 |
| Example 18 | A | 0.92 | B | B | B | B | 0.05 |
| Example 19 | B | 0.89 | A | A | A | A | 0.03 |
| Example 20 | B | 0.89 | A | B | B | A | 0.03 |
| Example 21 | B | 0.89 | A | A | A | B | 0.05 |
| Example 22 | B | 0.89 | A | C | B | B | 0.05 |
| Example 23 | B | 0.88 | C | C | C | B | 0.05 |
| Example 24 | B | 0.86 | A | B | A | B | 0.05 |
| Example 25 | C | 0.84 | A | A | A | C | 0.07 |
| Example 26 | A | 0.93 | A | B | A | C | 0.07 |
| Example 27 | C | 0.84 | C | C | C | C | 0.07 |
| Example 28 | A | 0.92 | C | B | B | B | 0.05 |
| Example 29 | A | 0.92 | c | D | D | C | 0.07 |
| Comparative Example 1 | D | 0.72 | A | B | A | C | 0.07 |
| Comparative Example 2 | D | 0.74 | B | C | C | C | 0.07 |
| Comparative Example 3 | B | 0.87 | D | D | D | C | 0.07 |
| Comparative Example 4 | A | 0.92 | D | D | D | B | 0.05 |
| Comparative Example 5 | B | 0.92 | D | D | D | B | 0.05 |
| Comparative Example 6 | D | 0.71 | C | D | C | B | 0.05 |
| Comparative Example 7 | D | 0.62 | A | B | A | D | 0.1 |
| Comparative Example 8 | D | 0.72 | A | C | A | D | 0.1 |
| Comparative Example 9 | C | 0.81 | D | D | D | D | 0.1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-166511, filed Oct. 8, 2021, and Japanese Patent Application No. 2022-141488, filed Sep. 6, 2022, which are hereby incorporated by reference herein in their entirety.

What is claimed is:

1. An electrophotographic photosensitive member, comprising:

an electroconductive support;

a photosensitive layer; and a protection layer, the protection layer comprising an electroconductive particle, the electroconductive particle having a surface comprising a titanium oxide containing a niobium atom;

an atomic concentration ratio of the niobium atom to the titanium atom in the titanium oxide being 0.04 to 0.20, and a niobium atom/titanium atom concentration ratio at an inside portion that is 5% of a maximum diameter of the particle from the surface of the particle being at least 2.0 times as high as a niobium atom/titanium atom concentration ratio at a center of the maximum particle diameter in energy-dispersive X-ray spectroscopy (EDS analysis) with a scanning transmission electron microscope (STEM); and the electroconductive particle being surface-treated with a compound having a silicon atom, wherein a content ratio of the electroconductive particle in the protection layer is 5 to less than 40 vol % with respect to a total volume of the protection layer, and $$0<d(\mathrm{Ti})\leq 2.0,$$

$$0<d(\mathrm{Si})\leq 8.0,\text{ and}$$

$$0.01\leq d(\mathrm{Ti})/d(\mathrm{Si})\leq 1.0$$

when at a surface of the protection layer, a total of a relative concentration d(C) of a carbon atom, a relative concentration d(O) of an oxygen atom, a relative concentration d(Ti) of the titanium atom, a relative concentration d(Nb) of the niobium atom, and a relative concentration d(Si) of the silicon atom is defined as 100.0 atomic %, as determined by X-ray photoelectron spectroscopy.

2. The electrophotographic photosensitive member according to claim 1, wherein $$11\leq \log A\leq 14,$$

$$11\leq \log B\leq 14,\text{ and}$$

$$0\leq \log(A/B)\leq 2.0$$

when A [Ω·cm] is a volume resistivity of the protection layer under an atmosphere at 23° C. and 50% RH and B [Ω·cm] is a volume resistivity of the protection layer under an atmosphere at 32.5° C. and 80% RH.

3. The electrophotographic photosensitive member according to claim 1, wherein the electroconductive particle has a number-average particle diameter of 60 to 150 nm.

4. A process cartridge, comprising:

an electrophotographic photosensitive member; and at least one unit selected from the group consisting of a charging unit, a developing unit and a cleaning unit;

the process cartridge integrally supporting the electrophotographic photosensitive member and the at least one unit, and being detachably attachable onto a main body of an electrophotographic apparatus;

the electrophotographic photosensitive member comprising an electroconductive support, a photosensitive layer and a protection layer;

the protection layer comprising an electroconductive particle, the electroconductive particle having a surface comprising a titanium oxide containing a niobium atom;

an atomic concentration ratio of the niobium atom to the titanium atom in the titanium oxide being 0.04 to 0.20, and a niobium atom/titanium atom concentration ratio at an inside portion that is 5% of a maximum diameter of the particle from the surface of the particle being at least 2.0 times as high as a niobium atom/titanium atom concentration ratio at a center of the maximum particle diameter in energy-dispersive X-ray spectroscopy (EDS analysis) with a scanning transmission electron microscope (STEM); and the electroconductive particle being surface-treated with a compound having a silicon atom, wherein a content ratio of the electroconductive particle in the protection layer is 5 to less than 40 vol % with respect to a total volume of the protection layer, and $$0<d(\mathrm{Ti})\leq 2.0,$$

$$0<d(\mathrm{Si})\leq 8.0,\text{ and}$$

$$0.01\leq d(\mathrm{Ti})/d(\mathrm{Si})\leq 1.0$$

when at a surface of the protection layer, a total of a relative concentration d(C) of a carbon atom, a relative concentration d(O) of an oxygen atom, a relative concentration d(Ti) of the titanium atom, a relative concentration d(Nb) of the niobium atom, and a relative concentration d(Si) of the silicon atom is defined as 100.0 atomic %, as determined by X-ray photoelectron spectroscopy.

5. An electrophotographic apparatus, comprising:

an electrophotographic photosensitive member;

a charging unit;

an exposing unit;

a developing unit; and a transfer unit, the electrophotographic photosensitive member comprising an electroconductive support, a photosensitive layer and a protection layer;

the protection layer comprising an electroconductive particle, the electroconductive particle having a surface comprising a titanium oxide containing a niobium atom;

an atomic concentration ratio of the niobium atom to the titanium atom in the titanium oxide being 0.04 to 0.20, and a niobium atom/titanium atom concentration ratio at an inside portion that is 5% of a maximum diameter of the particle from the surface of the particle being at least 2.0 times as high as a niobium atom/titanium atom concentration ratio at a center of the maximum particle diameter in energy-dispersive X-ray spectroscopy (EDS analysis) with a scanning transmission electron microscope (STEM); and the electroconductive particle being surface-treated with a compound having a silicon atom, wherein a content ratio of the electroconductive particle in the protection layer is 5 to less than 40 vol % with respect to a total volume of the protection layer, and $$0<d(\mathrm{Ti})\leq 2.0,$$

$$0<d(\mathrm{Si})\leq 8.0,\text{ and}$$

$$0.01\leq d(\mathrm{Ti})/d(\mathrm{Si})\leq 1.0$$

when at a surface of the protection layer, a total of a relative concentration d(C) of a carbon atom, a relative concentration d(O) of an oxygen atom, a relative concentration d(Ti) of the titanium atom, a relative concentration d(Nb) of the niobium atom, and a relative concentration d(Si) of the silicon atom is defined as 100.0 atomic %, as determined by X-ray photoelectron spectroscopy.

* * * * *